(12) United States Patent
Fish et al.

(10) Patent No.: US 7,783,571 B2
(45) Date of Patent: Aug. 24, 2010

(54) ATM SYSTEM FOR RECEIVING CASH DEPOSITS FROM NON-NETWORKED CLIENTS

(75) Inventors: Howard Fish, Highlands Ranch, CO (US); Jake Sterling, Creve Coeur, MO (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 11/756,155

(22) Filed: May 31, 2007

(65) Prior Publication Data

US 2008/0301047 A1    Dec. 4, 2008

(51) Int. Cl.
*G06Q 40/00* (2006.01)
(52) U.S. Cl. ....................................................... 705/43
(58) Field of Classification Search .................... 705/43
See application file for complete search history.

(56) References Cited

U.S. PATENT DOCUMENTS

| | | | |
|---|---|---|---|
| 3,599,151 | A | 8/1971 | Harr |
| 3,783,755 | A | 1/1974 | Lagin |
| 3,833,395 | A | 9/1974 | Gosnell |
| 4,032,931 | A | 6/1977 | Haker |
| 4,321,672 | A | 3/1982 | Braun et al. |
| 4,454,414 | A | 6/1984 | Benton |
| 4,528,643 | A | 7/1985 | Freeny, Jr. |
| 4,562,340 | A | 12/1985 | Tateisi et al. |
| 4,562,341 | A | 12/1985 | Ohmae et al. |
| 4,630,200 | A | 12/1986 | Ohmae et al. |
| 4,678,895 | A | 7/1987 | Tateisi et al. |
| 4,700,055 | A | 10/1987 | Kashkashian, Jr. |
| 4,722,554 | A | 2/1988 | Pettit |
| 4,812,628 | A | 3/1989 | Boston et al. |
| 4,884,212 | A | 11/1989 | Stutsman |

(Continued)

FOREIGN PATENT DOCUMENTS

AU        763008 B        7/2003

(Continued)

OTHER PUBLICATIONS

Longo, Tracy; Leave home without traveler's check?(Managing Money); Kiplinger's Personal Finance magazine,v50,n5,p. 87(2), May 1996.*

(Continued)

*Primary Examiner*—Hani Kazimi
*Assistant Examiner*—Hatem Ali
(74) *Attorney, Agent, or Firm*—Townsend and Townsend and Crew LLP

(57) ABSTRACT

A systems and methods for depositing foreign funds into a native account using a foreign transaction machine are disclosed according to one embodiment of the invention. A foreign transaction machine, such as an ATM, receives and financial account number associated with a financial account and determines the native currency associated with the financial account. The foreign ATM may then receive cash in a foreign currency. AN exchange rate is received from within the ATM or through a network connected to the ATM. The foreign funds are then converted according to the exchange rate into native funds. The native funds are then deposited into the financial account. In other embodiments, the transaction machine provides transaction cards with native funds in response to receiving foreign currency.

36 Claims, 7 Drawing Sheets

U.S. PATENT DOCUMENTS

| | | |
|---|---|---|
| 4,902,881 A | 2/1990 | Janku |
| 4,961,142 A | 10/1990 | Elliott et al. |
| 4,972,318 A | 11/1990 | Brown et al. |
| 5,021,967 A | 6/1991 | Smith |
| 5,053,607 A | 10/1991 | Carlson et al. |
| 5,119,293 A | 6/1992 | Hammond |
| 5,146,067 A | 9/1992 | Sloan et al. |
| 5,175,682 A | 12/1992 | Higashiyama et al. |
| 5,220,501 A | 6/1993 | Lawlor et al. |
| 5,236,960 A | 8/1993 | Harrison et al. |
| 5,250,906 A | 10/1993 | Bills et al. |
| 5,255,182 A | 10/1993 | Adams |
| 5,283,829 A | 2/1994 | Anderson |
| 5,350,906 A | 9/1994 | Brody et al. |
| 5,352,876 A | 10/1994 | Watanabe et al. |
| 5,367,452 A | 11/1994 | Gallery et al. |
| 5,408,077 A | 4/1995 | Campo et al. |
| 5,426,594 A | 6/1995 | Wright et al. |
| 5,440,108 A | 8/1995 | Tran et al. |
| 5,448,043 A | 9/1995 | Nakano et al. |
| 5,448,471 A | 9/1995 | Deaton et al. |
| 5,461,217 A | 10/1995 | Claus |
| 5,464,971 A | 11/1995 | Sutcliffe et al. |
| 5,465,206 A | 11/1995 | Hilt et al. |
| 5,470,427 A | 11/1995 | Mikel et al. |
| 5,471,669 A | 11/1995 | Lidman |
| 5,475,603 A | 12/1995 | Korowotny |
| 5,477,037 A | 12/1995 | Berger |
| 5,477,038 A | 12/1995 | Levine et al. |
| 5,484,988 A | 1/1996 | Hills et al. |
| 5,491,325 A | 2/1996 | Huang et al. |
| 5,504,677 A | 4/1996 | Pollin |
| 5,504,808 A | 4/1996 | Hamrick, Jr. |
| 5,510,979 A | 4/1996 | Moderi et al. |
| 5,511,114 A | 4/1996 | Stimson |
| 5,513,117 A | 4/1996 | Small |
| 5,524,073 A | 6/1996 | Stambler |
| 5,555,496 A | 9/1996 | Tackbary et al. |
| 5,557,516 A | 9/1996 | Hogan |
| 5,570,465 A | 10/1996 | Tsakanikas |
| 5,577,109 A | 11/1996 | Stimson et al. |
| 5,592,400 A | 1/1997 | Sasou |
| 5,604,802 A | 2/1997 | Holloway |
| 5,622,388 A | 4/1997 | Alcordo |
| 5,629,982 A | 5/1997 | Micali |
| 5,637,845 A | 6/1997 | Kolls |
| 5,638,283 A | 6/1997 | Herbert |
| 5,649,117 A | 7/1997 | Landry |
| 5,650,604 A | 7/1997 | Marcous et al. |
| 5,657,201 A | 8/1997 | Kochis |
| 5,659,165 A | 8/1997 | Jennings et al. |
| 5,677,955 A | 10/1997 | Doggett et al. |
| 5,678,010 A | 10/1997 | Pittenger et al. |
| 5,679,940 A | 10/1997 | Templeton et al. |
| 5,699,528 A | 12/1997 | Hogan |
| 5,717,868 A | 2/1998 | James |
| 5,721,768 A | 2/1998 | Stimson et al. |
| 5,732,136 A | 3/1998 | Murphree et al. |
| 5,732,400 A | 3/1998 | Mandler et al. |
| 5,745,886 A | 4/1998 | Rosen |
| 5,757,917 A | 5/1998 | Rose et al. |
| 5,764,888 A | 6/1998 | Bolan et al. |
| 5,774,879 A | 6/1998 | Custy et al. |
| 5,778,067 A | 7/1998 | Jones et al. |
| 5,779,379 A | 7/1998 | Mason et al. |
| 5,783,808 A | 7/1998 | Josephson |
| 5,787,403 A | 7/1998 | Randle |
| 5,794,207 A | 8/1998 | Walker et al. |
| 5,796,832 A | 8/1998 | Kawan |
| 5,815,657 A | 9/1998 | Williams et al. |
| 5,825,617 A | 10/1998 | Kochis et al. |
| 5,826,241 A | 10/1998 | Stein et al. |
| 5,828,875 A | 10/1998 | Halvarsson et al. |
| 5,832,463 A | 11/1998 | Funk |
| 5,868,236 A | 2/1999 | Rademacher |
| 5,870,718 A | 2/1999 | Spector |
| 5,875,435 A | 2/1999 | Brown |
| 5,878,211 A | 3/1999 | Delagrange et al. |
| 5,880,446 A | 3/1999 | Mori et al. |
| 5,893,080 A | 4/1999 | McGurl et al. |
| 5,896,298 A | 4/1999 | Richter |
| 5,897,625 A | 4/1999 | Gustin et al. |
| 5,897,989 A | 4/1999 | Beecham |
| 5,898,154 A | 4/1999 | Rosen |
| 5,899,980 A | 5/1999 | Wilf et al. |
| 5,899,982 A | 5/1999 | Randle |
| 5,902,983 A | 5/1999 | Crevelt et al. |
| 5,903,633 A | 5/1999 | Lorsch |
| 5,903,881 A | 5/1999 | Schrader et al. |
| 5,909,492 A | 6/1999 | Payne et al. |
| 5,909,673 A | 6/1999 | Gregory |
| 5,910,988 A | 6/1999 | Ballard |
| 5,913,202 A | 6/1999 | Motoyama |
| 5,915,023 A | 6/1999 | Bernstein |
| 5,918,909 A | 7/1999 | Fiala et al. |
| 5,920,629 A | 7/1999 | Rosen |
| 5,920,847 A | 7/1999 | Kolling et al. |
| 5,920,848 A | 7/1999 | Schutzer et al. |
| 5,936,221 A | 8/1999 | Corder et al. |
| 5,937,396 A | 8/1999 | Konya |
| 5,949,044 A | 9/1999 | Walker et al. |
| 5,952,639 A | 9/1999 | Ohki et al. |
| 5,953,709 A | 9/1999 | Gilbert et al. |
| 5,953,710 A | 9/1999 | Fleming |
| 5,960,412 A | 9/1999 | Tackbary et al. |
| 5,960,963 A | 10/1999 | Chodack et al. |
| 5,963,647 A | 10/1999 | Downing et al. |
| 5,974,146 A | 10/1999 | Randle et al. |
| 5,974,194 A | 10/1999 | Hirani et al. |
| RE36,365 E | 11/1999 | Levine et al. |
| 5,984,181 A | 11/1999 | Kreft |
| 5,987,426 A | 11/1999 | Goodwin, III |
| 5,987,438 A | 11/1999 | Nakano et al. |
| 5,991,748 A | 11/1999 | Taskett |
| 5,993,047 A | 11/1999 | Novogrod et al. |
| 5,999,624 A | 12/1999 | Hopkins |
| 6,003,763 A | 12/1999 | Gallagher et al. |
| 6,006,988 A | 12/1999 | Behrmann et al. |
| 6,011,833 A | 1/2000 | West |
| 6,012,048 A | 1/2000 | Gustin et al. |
| 6,015,087 A | 1/2000 | Seifert et al. |
| 6,027,216 A | 2/2000 | Guyton |
| 6,029,150 A | 2/2000 | Kravitz |
| 6,030,000 A | 2/2000 | Diamond |
| 6,032,133 A | 2/2000 | Hilt et al. |
| 6,032,137 A | 2/2000 | Ballard |
| 6,035,285 A | 3/2000 | Schlect et al. |
| 6,035,406 A | 3/2000 | Moussa et al. |
| 6,039,245 A | 3/2000 | Symonds et al. |
| 6,039,250 A | 3/2000 | Ito et al. |
| 6,044,360 A | 3/2000 | Picciallo |
| 6,044,362 A | 3/2000 | Neely |
| 6,045,039 A | 4/2000 | Stinson et al. |
| 6,058,417 A | 5/2000 | Hess et al. |
| 6,064,990 A | 5/2000 | Goldsmith |
| 6,070,150 A | 5/2000 | Remington et al. |
| 6,070,156 A | 5/2000 | Hartsell et al. |
| 6,070,798 A | 6/2000 | Nethery |
| 6,078,907 A | 6/2000 | Lamm |
| 6,081,790 A | 6/2000 | Rosen |
| 6,088,683 A | 7/2000 | Jalili |
| 6,088,684 A | 7/2000 | Custy et al. |
| 6,097,834 A | 8/2000 | Krouse et al. |
| 6,098,053 A | 8/2000 | Slater |

| | | | | | | |
|---|---|---|---|---|---|---|
| 6,106,020 | A | 8/2000 | Leef et al. | 6,801,833 B2 | 10/2004 | Pintsov et al. |
| 6,119,106 | A | 9/2000 | Mersky et al. | 6,814,282 B2 | 11/2004 | Seifert et al. |
| 6,119,931 | A | 9/2000 | Novogrod | 6,827,260 B2 | 12/2004 | Stoutenburg et al. |
| 6,122,625 | A | 9/2000 | Rosen | 6,829,588 B1 | 12/2004 | Stoutenburg et al. |
| 6,128,603 | A | 10/2000 | Dent et al. | 6,847,947 B1 | 1/2005 | Kambour et al. |
| 6,129,275 | A | 10/2000 | Urquhart et al. | 6,886,742 B2 | 5/2005 | Stoutenburg et al. |
| 6,134,561 | A | 10/2000 | Brandien et al. | 6,908,031 B2 | 6/2005 | Seifert et al. |
| 6,145,738 | A | 11/2000 | Stinson et al. | 6,911,910 B2 | 6/2005 | Sansone et al. |
| 6,148,377 | A | 11/2000 | Carter et al. | 6,922,673 B2 | 7/2005 | Karas et al. |
| 6,149,056 | A | 11/2000 | Stinson et al. | 6,943,312 B2 | 9/2005 | Zimmermann |
| 6,164,528 | A | 12/2000 | Hills et al. | 7,140,538 B2 | 11/2006 | Lee |
| 6,167,386 | A | 12/2000 | Brown | 7,219,832 B2 * | 5/2007 | Fillinger et al. .............. 235/379 |
| 6,169,975 | B1 | 1/2001 | White et al. | 7,229,011 B2 | 6/2007 | Hansen et al. |
| 6,175,823 | B1 | 1/2001 | Van Dusen | 7,580,886 B1 * | 8/2009 | Schulz ........................ 705/39 |
| 6,189,787 | B1 | 2/2001 | Dorf | 2001/0001856 A1 | 5/2001 | Gould et al. |
| 6,193,152 | B1 | 2/2001 | Fernando et al. | 2001/0018660 A1 | 8/2001 | Sehr |
| 6,193,155 | B1 | 2/2001 | Walker et al. | 2001/0023409 A1 | 9/2001 | Keil |
| 6,199,761 | B1 | 3/2001 | Drexler | 2001/0023415 A1 | 9/2001 | Keil |
| 6,202,054 | B1 | 3/2001 | Lawlor et al. | 2001/0032878 A1 | 10/2001 | Tsiounis et al. |
| 6,206,283 | B1 | 3/2001 | Bansal et al. | 2001/0042785 A1 | 11/2001 | Walker et al. |
| RE37,122 | E | 4/2001 | Levine et al. | 2001/0047342 A1 | 11/2001 | Cuervo |
| 6,223,168 | B1 | 4/2001 | McGurl et al. | 2001/0051876 A1 | 12/2001 | Seigel et al. |
| 6,246,996 | B1 | 6/2001 | Stein et al. | 2001/0054003 A1 | 12/2001 | Chien et al. |
| 6,247,047 | B1 | 6/2001 | Wolff | 2002/0023055 A1 | 2/2002 | Antognini et al. |
| 6,260,024 | B1 | 7/2001 | Shkedy | 2002/0046106 A1 | 4/2002 | Ishibashi et al. |
| 6,263,446 | B1 | 7/2001 | Kausik et al. | 2002/0062285 A1 | 5/2002 | Amann |
| 6,269,369 | B1 | 7/2001 | Robertson | 2002/0087462 A1 | 7/2002 | Stoutenburg et al. |
| 6,275,829 | B1 | 8/2001 | Angiulo et al. | 2002/0087463 A1 | 7/2002 | Fitzgerald et al. |
| 6,286,756 | B1 | 9/2001 | Stinson et al. | 2002/0087467 A1 | 7/2002 | Muscavage et al. |
| 6,289,322 | B1 | 9/2001 | Kitchen et al. | 2002/0088851 A1 | 7/2002 | Hodes |
| 6,292,789 | B1 | 9/2001 | Schutzer | 2002/0091573 A1 | 7/2002 | Hodes |
| 6,295,522 | B1 | 9/2001 | Boesch | 2002/0104026 A1 | 8/2002 | Barra et al. |
| 6,298,336 | B1 | 10/2001 | Davis et al. | 2002/0111908 A1 | 8/2002 | Milberger et al. |
| 6,305,604 | B1 | 10/2001 | Ono | 2002/0152168 A1 | 10/2002 | Neofytides et al. |
| 6,308,887 | B1 | 10/2001 | Korman et al. | 2002/0152176 A1 | 10/2002 | Neofytides et al. |
| 6,314,169 | B1 | 11/2001 | Schelberg, Jr. et al. | 2002/0153414 A1 | 10/2002 | Stoutenburg et al. |
| 6,317,745 | B1 | 11/2001 | Thomas et al. | 2002/0153415 A1 * | 10/2002 | Minami et al. .............. 235/380 |
| 6,321,211 | B1 | 11/2001 | Dodd | 2002/0161702 A1 | 10/2002 | Milberger et al. |
| 6,321,984 | B1 | 11/2001 | McCall et al. | 2002/0174016 A1 | 11/2002 | Cuervo |
| 6,327,570 | B1 | 12/2001 | Stevens | 2002/0194124 A1 * | 12/2002 | Hobbs et al. ................... 705/39 |
| 6,327,575 | B1 | 12/2001 | Katz | 2003/0024979 A1 | 2/2003 | Hansen et al. |
| 6,343,279 | B1 | 1/2002 | Bissonette et al. | 2003/0028491 A1 | 2/2003 | Cooper |
| 6,347,305 | B1 | 2/2002 | Watkins | 2003/0046234 A1 | 3/2003 | Takadachi |
| 6,360,254 | B1 | 3/2002 | Linden et al. | 2003/0053609 A1 | 3/2003 | Risafi et al. |
| 6,367,693 | B1 | 4/2002 | Novogrod | 2003/0055780 A1 | 3/2003 | Hansen et al. |
| 6,394,343 | B1 | 5/2002 | Berg et al. | 2003/0069856 A1 | 4/2003 | Seifert et al. |
| 6,405,182 | B1 | 6/2002 | Cuervo | 2003/0111529 A1 | 6/2003 | Templeton et al. |
| 6,408,284 | B1 | 6/2002 | Hilt et al. | 2003/0120777 A1 | 6/2003 | Thompson et al. |
| 6,411,942 | B1 | 6/2002 | Fujimoto | 2003/0126036 A1 | 7/2003 | Mascavage et al. |
| 6,415,271 | B1 | 7/2002 | Turk et al. | 2003/0126075 A1 | 7/2003 | Mascavage et al. |
| 6,438,586 | B1 | 8/2002 | Hass | 2003/0126083 A1 | 7/2003 | Seifert et al. |
| 6,449,599 | B1 | 9/2002 | Payne et al. | 2003/0130907 A1 | 7/2003 | Karas et al. |
| 6,453,300 | B2 | 9/2002 | Simpson | 2003/0130940 A1 | 7/2003 | Hansen et al. |
| 6,473,500 | B1 | 10/2002 | Risafi et al. | 2003/0130948 A1 | 7/2003 | Algiene et al. |
| 6,484,936 | B1 | 11/2002 | Nicoll et al. | 2003/0135459 A1 | 7/2003 | Abelman et al. |
| 6,488,203 | B1 | 12/2002 | Stoutenburg et al. | 2003/0149662 A1 | 8/2003 | Shore |
| 6,502,747 | B1 | 1/2003 | Stoutenburg et al. | 2003/0154164 A1 | 8/2003 | Mascavage et al. |
| 6,510,453 | B1 | 1/2003 | Apfel et al. | 2003/0167237 A1 | 9/2003 | Degen et al. |
| 6,510,983 | B2 | 1/2003 | Horowitz et al. | 2003/0168510 A1 | 9/2003 | Allen |
| 6,539,363 | B1 | 3/2003 | Allgeier et al. | 2003/0177067 A1 | 9/2003 | Cowell et al. |
| 6,547,132 | B1 | 4/2003 | Templeton et al. | 2003/0178281 A1 | 9/2003 | Goto et al. |
| 6,549,119 | B1 | 4/2003 | Turner | 2003/0187789 A1 | 10/2003 | Karas et al. |
| 6,554,184 | B1 | 4/2003 | Amos | 2003/0187791 A1 | 10/2003 | Weichert et al. |
| 6,561,339 | B1 | 5/2003 | Olson et al. | 2003/0187792 A1 | 10/2003 | Hansen et al. |
| 6,575,358 | B2 | 6/2003 | O'Callaghan et al. | 2003/0195811 A1 | 10/2003 | Hayes et al. |
| 6,609,113 | B1 | 8/2003 | O'Leary et al. | 2003/0208445 A1 | 11/2003 | Compiano |
| RE38,255 | E | 9/2003 | Levine et al. | 2003/0217005 A1 | 11/2003 | Drummond et al. |
| 6,618,705 | B1 | 9/2003 | Wang et al. | 2003/0222135 A1 | 12/2003 | Stoutenburg et al. |
| 6,701,216 | B2 | 3/2004 | Miller et al. | 2003/0222136 A1 | 12/2003 | Bolle et al. |
| 6,736,314 | B2 | 5/2004 | Cooper et al. | 2003/0225689 A1 | 12/2003 | MacFarlane et al. |
| 6,738,689 | B2 | 5/2004 | Sansone | 2004/0015438 A1 | 1/2004 | Compiano |
| 6,761,309 | B2 | 7/2004 | Stoutenburg et al. | 2004/0024701 A1 | 2/2004 | Hansen et al. |
| 6,761,311 | B1 | 7/2004 | Algiene et al. | 2004/0049316 A1 | 3/2004 | Pintsov et al. |

| | | | |
|---|---|---|---|
| 2004/0059672 | A1 | 3/2004 | Baig et al. |
| 2004/0068437 | A1 | 4/2004 | McGee et al. |
| 2004/0078327 | A1 | 4/2004 | Frazier et al. |
| 2004/0088248 | A1 | 5/2004 | Cutler |
| 2004/0088261 | A1 | 5/2004 | Moore et al. |
| 2004/0098326 | A1 | 5/2004 | James et al. |
| 2004/0098328 | A1 | 5/2004 | Grant et al. |
| 2004/0098335 | A1 | 5/2004 | Michelsen |
| 2004/0107165 | A1 | 6/2004 | Blair et al. |
| 2004/0117302 | A1 | 6/2004 | Weichert et al. |
| 2004/0138947 | A1 | 7/2004 | McGee et al. |
| 2004/0139008 | A1 | 7/2004 | Mascavage et al. |
| 2004/0143552 | A1 | 7/2004 | Weichert et al. |
| 2004/0148286 | A1 | 7/2004 | Rogers |
| 2004/0153398 | A1 | 8/2004 | Baumgartner et al. |
| 2004/0158521 | A1 | 8/2004 | Newton et al. |
| 2004/0167860 | A1 | 8/2004 | Baxter et al. |
| 2004/0193897 | A1 | 9/2004 | Van Volkenburgh |
| 2004/0210476 | A1 | 10/2004 | Blair et al. |
| 2004/0210506 | A1 | 10/2004 | Algiene et al. |
| 2004/0210521 | A1 | 10/2004 | Crea et al. |
| 2004/0210523 | A1 | 10/2004 | Gains et al. |
| 2004/0211831 | A1 | 10/2004 | Stoutenburg et al. |
| 2004/0254833 | A1 | 12/2004 | Algiene et al. |
| 2005/0004702 | A1 | 1/2005 | McDonald |
| 2005/0017607 | A1 | 1/2005 | Weinberger |
| 2005/0154674 | A1* | 7/2005 | Nicholls et al. ............... 705/43 |
| 2005/0167481 | A1 | 8/2005 | Hansen et al. |
| 2005/0180550 | A1 | 8/2005 | McGee et al. |
| 2005/0187929 | A1 | 8/2005 | Staggs |
| 2005/0209958 | A1 | 9/2005 | Michelsen |
| 2005/0209961 | A1 | 9/2005 | Michelsen |
| 2006/0022032 | A1 | 2/2006 | Fillinger et al. |
| 2006/0038004 | A1 | 2/2006 | Rielly et al. |
| 2006/0060646 | A1* | 3/2006 | Lee ............................ 235/379 |
| 2006/0124729 | A1 | 6/2006 | Martin |
| 2006/0149667 | A1 | 7/2006 | Barry |
| 2006/0261149 | A1* | 11/2006 | Raghavendra Tulluri .... 235/379 |
| 2007/0007332 | A1 | 1/2007 | Hansen et al. |
| 2007/0057038 | A1 | 3/2007 | Gannon |
| 2008/0059350 | A1* | 3/2008 | Raymond et al. ............. 705/35 |

FOREIGN PATENT DOCUMENTS

| | | |
|---|---|---|
| CA | 2383173 A1 | 1/2001 |
| EP | 0 481 135 A1 | 4/1992 |
| EP | 0 745 961 A2 | 4/1996 |
| EP | 0 949 596 A2 | 10/1999 |
| EP | 1 018 711 A1 | 12/2000 |
| EP | 1 077 436 A2 | 2/2001 |
| FR | 2728983 A1 | 7/1996 |
| IE | 990584 | 7/2000 |
| WO | WO 96/26508 A1 | 8/1996 |
| WO | WO 96/36926 A1 | 11/1996 |
| WO | WO 98/49644 A1 | 11/1998 |
| WO | WO 98/50875 A2 | 11/1998 |
| WO | WO 99/22291 A1 | 5/1999 |
| WO | WO 99/28872 A1 | 6/1999 |
| WO | WO 00/22559 A1 | 4/2000 |
| WO | WO 00/46725 A1 | 8/2000 |
| WO | WO 00/54122 A2 | 9/2000 |
| WO | WO 00/67177 A2 | 11/2000 |
| WO | WO 00/79452 A2 | 12/2000 |
| WO | WO 01/04816 A1 | 1/2001 |
| WO | WO 01/04846 A1 | 1/2001 |
| WO | WO 01/39093 A1 | 5/2001 |
| WO | WO 02/05195 A1 | 1/2002 |

OTHER PUBLICATIONS

Marino, Viviano; Traveler can lose despite dollar's strength; Holland,MI,US) pCI; Publi Date: 970727.*

05117909 Supplier No. 10467195; Traveling abroad? . . . (Business Money management); Profit-Building Stretegies for Business Owners, v21, n2, p. 8(1), Feb. 1991.*

PCT International Search Report and Written Opinion mailed Sep. 2, 2008, International Application No. PCT/US2008/064999, 9 pages.

About Western Union: Company History, http://www.payment-solutions.com/history.html, 2005, 2 pages.

Aeromexico and Western Union Partner to Offer a Cash Payment Option for Booking Airline Tickets; 2004, Press Release, 2 pages.

American Express in New Ad Drive; 1990, American Banker, 1 page.

American Express Introduces Automated Money Order Dispenser; 1991, Professional Check Casher, 1 page.

American Express Money Orders, Travelers Cheques Now on Sale; 1936, Dots and Dashes, 2 pages.

American Express Unit Introduces State-Of-The-Art Automated Money Order Dispenser; 1990, Tri-State Food News, 1 page.

American Greeting Cards Click-Through; 38 pages.

Amerinet, Inc., "Debit-It!—The Best Idea In Payment Systems Since the Credit Card", downloaded from website http://www.debit-it.com/ on Feb. 7, 2000, 8 pages.

Amex aims expansion strategy at local currency exchanges; 1990, Crain's Chicago Business, 1 page.

Amex Money Order Dispenser; 1990, The Nilson Report, 1 page.

Amex tests Moneygram; 1990, Adnews, 1 page.

And a Nine—Second Money Order Dispenser; 1991, Post-News, vol. 17, No. 1, 1 page.

Andrejczak—DIALCG File—American Banker-v164-date May 17, 1999 pp. 2.

Announcing Quick Collect Online; 2002, Western Union's Professional Collector, 3 pages.

Annual Report of First Data Corporation; 1998, 3 pages.

Annual Report of First Data Corporation; 1999, 2 pages.

Annual Report of the President of the Western Union Telegraph Company; 1873, pp. 8-11.

Annual Report of the President of the Western Union Telegraph Company; 1874, pp. 8-11.

Annual Report of the Western Union Corporation; 1990, 4 pages.

Annual Report of the Western Union Telegraph Company, 1975, 3 pages.

Annual Report of the Western Union Telegraph Company; 1935, 2 pages.

Annual Report of the Western Union Telegraph Company; 1940, pp. 9 and 22.

Annual Report of the Western Union Telegraph Company; 1947, 2 pages.

Annual Report of the Western Union Telegraph Company; 1949, 2 pages.

Annual Report of the Western Union Telegraph Company; 1951, 2 pages.

Annual Report of the Western Union Telegraph Company; 1953, 2 pages.

Annual Report of the Western Union Telegraph Company; 1954, 3 pages.

Annual Report of the Western Union Telegraph Company; 1973, 5 pages.

Annual Report of the Western Union Telegraph Company; 1974, 2 pages.

Annual Report of the Western Union Telegraph Company; 1978, 2 pages.

Annual Report of the Western Union Telegraph Company; 1981, 2 pages.

AT&T Wireless to Offer Western Union SwiftPay as Replenishment Option for AT&T Free2Go Wireless Prepaid Customers; 2001, PR Newswire Association, 2 pages.

Behind the Scenes of Life; 1996, First Data Corporation Annual Report, 3 pages.

Bidpay.com: Whois search results; 2003, http://www.networksolutions.com/en_US/whois/results.jhtml;jsessionid+VZDZVYDD1J, 2 pages.

BidPay: Seller FAQs—Receiving Payments and Using the Money Order Service; 1999-2003; 7 pages.

Billserv.com Launches bills.com, an internet Portal for Consumers to Pay All Bills Online at No Cost; 2000, Business Wire, 2 pages.

Boneh, Dan: "Beaming Money by Email is Web's Next Killer App"; 1999, PR Newswire, 4 pages.
Business Wire "*E-Commerce, Email and E-greeting Cards Combine in New Web Site Designed by Interactive Bureau*", Sep. 14, 1999 (abstract), [online] [retrieved on May 1, 2002], retrieved from PROQUEST Database, 2 pages.
Candygram payment service, 1 page.
CES/NaBANCO Introduces Stored Value Card Technology: Blockbuster Video is First Merchant Partner; 1996, First Data Corporation News Release, 3 pages.
Collect your delinquent accounts by Telegraph; 1933, Form 1229-A, 1 page.
Collection by Money Transfer: MoneyGram Service Removes Time-Consuming Steps to Commercial Collections; 1990, Collector, p. 36.
Common Values: Uncommon Opportunities; 1995, First Data Corporation Annual Report, 2 pages.
Company Profile: The Western Union Convenience Pay Service; 2004, 4 pages.
Confinity, Inc., *PayPal.com, How PayPal.com Works*, downloaded from website http://www.paypal.com on Feb. 7, 2000, 7 pages.
Dotbank, *The Way to Send and Receive Money on the Internet*, downloaded from website http://www.dotbank.com, Feb. 7, 2000, 6 pages.
Dots and Dashes; 1935, vol. 11, No. 9, 4 pages.
Dunne, S., "MCPOS Authorization and Batching Application, Functional Specification Issue 1.0," Flexicom Systems, 64 pages, Jul. 27, 1998.
FDR to Offer HNC Software's Real-Time Fraud Detection: New distribution Agreement to Benefit Card Banks; 1996, First Data Resources News Release, 3 pages.
Federal Benefits Checks are Going Away—Don't Let Your Customers Go with Them: Announcing the Western Union Benefits Quick Cash Program; 4 pages.
First Data Acquires PaySys International; 2001, Press Release, 2 pages.
First Data Aligns with CyberCash to Offer New Electronic Coin Service; 1996, First Data Corporation News Release, 3 pages.
First Data and Netscape Announce Program to Help Businesses Establish Payment-Enabled Web Sites; 1996, First Data Corporation News Release, 5 pages.
First Data and Netscape Offering Internet Payment Processing Service; 1996, First Data Corporation News Release, 3 pages.
First Data InfoSource Offers Database Analysis with DecisionScope; 1996, First Data Corporation News Release, 2 pages.
First Data to Offer Card Profitability Software from HNC: Distribution Agreement Poised to Repeat Falcon Success;1996, HNC Software, Inc. News Release, 3 pages.
First Data, First USA Paymentech, GE Capital Invest in First Virtual Holdings; 1996, First Virtual Holdings Corporation News Release, 3 pages.
First located example of a money transfer; Aug. 25, 1873, 1 page.
Get your Collect Card; 1939, Dots and Dashes, 2 pages.
Greenia—1952 Website computermuseumli—Lexikon Services 1982 2002-2003 pp. 3.
Guess What? The check's not in the mail; 2001, Western Union's Professional Collector, 3 pages.
Hoffman, Karen Epper; "PayPal Still Running Free"; 2003, Bank Technology News, 3 pages.
How money by phone was paid;; Money Transfer Service: Book of Rules and List of Offices; 1926, Western Union Telegraph Company, 3 pages.
Idealab Company, PayMe.com, downloaded from website http://ssl.idealab.com on Feb. 16, 2000, 7 pages.
If you're not getting your payment with Quick Collect, chances are you're not getting it; 2001, 2 pages.
Intell-A-Check Corp.: "Intell-A-Check!—The Way to get Paid", Intell-A-Check product overview, retrieved from http://www.icheck.com/ on Feb. 7, 2000, 7 pages.
Introducing the Western Union Cash Card Program; 1998, 2 pages.
It takes a certain person to make a good collector. But it takes a good manager to make a champion; 2001, Western Union's Professional Collector, 3 pages.
Lan Airline Alliance Carriers and Western Union Offer Travelers Additional Payment Options; 2005, 3 pages.
Last of the Pony Express Riders Tells His Story; 1932, Dots and Dashes, vol. 8, No. 10, 2 pages.
Latour, Almar; "PayPal Electronic Plan May be on the Money in Years to Come"; 1999, The Wall Street Journal, 2 pages.
Lawton, George; "Biometrics: A New Era in Security"; 1998, Computer, vol. 31, No. 8, pp. 16-18.
Leading Provider of Transaction Card Processing Selects Connect Oneserver Software as a Solution for Advanced Internet Merchant Services: First Data Chooses OneServer as an Application to Deliver the Internet to Banks and Merchants; 1996, press Release, 4 pages.
Levin, Gary; "Western Union not fading into sunset; new services are added as telegrams drop"; 1992, 2 pages.
List of Prepaid Services, http://www.westernunion.com/info/osComparePrePaid.asp, 1 page.
Loved one stranded? Send Cash; 1991, Akron Beacon Journal, 2 pages.
Luxury Brands LLC: World Famous Brands at Liquidation Proces; http://www.auctionbytes.com/cab/pages/payment, 3 pages.
McEnaney-DIALCG File 01896530—Akron Beacon Journal—Jul. 12, 1997—3 Pages.
Messenger Work Full of Adventure, Excitement; 1933, Dots and Dashes, vol. 9, No. 11, 2 pages.
Money Order with confirmation; 1948, 1 page.
Money Orders by Phone; 1935, Fortune Magazine, 3 pages.
Money-wire giants battle for business: Currency exchanges wooed; 1991, Chicago Sun Times, 2 pages.
MoneyZap.com Greeting Card Process Flow; 2000, 2 pages.
NaBanco, "Caribbean News," vol. 8, 2 pages, May 31, 1995.
Nation Receives Time Over Western Union Network; 1931, Dots and Dashes, vol. 7, No. 5, 2 pages.
Nationwide Credit Collectors Act Globally; 2001, Western Union's Professional Collector, 3 pages.
Netscape Announces Netscape Livepayment to Facilitate Internet Commerce; 1996, Netscape News Release, 4 pages.
New Western Union SwiftPay Service Continues Expansion of Consumer-to-Business Payment Options; 1999, PR Newswire Association, 2 pages.
NTS Completes Merger with EDS Fleet Services; New First Data Unit Sets Sights on New Markets; 1996, NTS Press Release, 3 pages.
Only Western Union, no date, 2 pages.
PayPal for the Palm; http://handheldnews.com/file.asp?ObjectID=5401, Printed date Oct. 10, 2002; 2 pages.
PayPal.com Case Study; http://fox.rollins.edu/~slackman/PayPal.htm, 2003, 7 pages.
PayPal: The way to send and receive money online, 2002; 4 pages.
PayPal-News; http://www.ndrys.com/paypal.html, 2003, 3 pages.
PaySys—company overview, no date, 2 pages.
PaySys signs up four Asian distributors; 1997 Orlando Business Journal, 3 pages.
Picture of Bill payment form or advertisement, no date, 1 page.
Pilgrims Started Thanksgiving Custom; Dots and Dashes, vol. 4, No. 11, Nov. 1928, 2 pages.
Plotkin, Hal; "Beam Me up Some Cash"; 1999, Silicon Valley Insider, 3 pages.
PR Newswire—Western Union Financial Services forms—Aug. 22-1991.pdf.
Press Release: "Western Union Announces ATM Card Payout for Money Transfer Transactions"; 2001, URL: http://news.firstdata.com/media/ReleaseDetail.cfm?ReleaseID=849995>.
Products and Services for PaySys, no date, 2 pages.
Purchasing American Airlines Tickets Just Got Easier; 2005, 4 pages.
Quick Cash and Quick Collect: Western Union's money-movers; 1990, *Newsbriefs*, vol. 2, No. 1, 3 pages.
Quick Cash: A safe and reliable way to send funds around the world; http://www.payment-solutions.com/quickcash.html, 2005, 1 page.
Quick Collect Sales Presentation; Jan. 2004, 28 pages.
Quick Collect: Government/Child Support Agency Name, Training Guide; 2004, 7 pages.
Quick Collect; Western Union Training Guide; 2004, 10 pages.
Quick Pay: The Convenient and reliable way to receive payments from customers worldwide; http://www.payment-solutions.com/quickpay.html, 2005, 3 pages.
Refund of Money Transfers; 1913, Journal of the Telegraph, 2 pages.

Remittance for order sent via Western Union; 1933, 2 pages.
Reynolds Arcade was Western Union Birthplace; 1933, Dots and Dashes, vol. 9, No. 8, 2 pages.
Rhode Island becomes first state to accept child support payments at Western Union: Government Payment Leader govONE Solutions Adds Walk-in to Full Suite of Payment Options; 2002, 3 pages.
Rhode Island becomes first state to accept child support payments at Western Union: More than 50 Western Union Convenience Pay Agent Locations Offer New Level of Convenience to Rhode Island Residents Who Pay Child Support—; 2002, 3 pages.
SBC Communications adds Western Union Locations for Walk-in Customer Bill Payments; SBC News Release, Sep. 7, 2005, 2 pages.
Seifert—Method & System for Electronic Transfer—FDC 0167PUS—no date, 21 pages.
Send your payment using Western Union Quick Collect; Feb. 2, 2004, 2 pages.
Send Your Utility Bill Payment from Here!; no date, 3 pages.
Sending Cash in a Flash; 1990, Travel & Leisure, p. 42.
Sending Cash in a Flash: There are more ways to do it than you might think; 1991, 2 pages.
Shopping Order service and gift service; 1934, Western Union Telegraph Company, Money Order Book, 6 pages.
Signature Services: Helping financial institutions send funds faster; http://www.payment-solutions.com/signature.html, 2005, 1 page.
State of Hawaii to Accept Child Support Payments at Western Union; 2004, 2 pages.
State of New York Banking Department: Staff Letters and Memoranda; 2000, http://www.banking.state.ny.us/lo000718.htm, 2 pages.
Steiner, Ina: "Accepting Credit Cards When You Sell Items: ProPay and Billpoint Payment Services"; 2000 Auction Bytes, 4 pages.
Steiner, Ina: "BidPay.com Offers Click and Pay Service for buyers"; 2000, Auction Bytes, 4 pages.
Steiner, Ina: "Follow-up to BidPay Article"; 2000, Auction Bytes, 3 pages.
Steiner, Ina: "PayPal Online Payment Service—Another Way to Pay for Auction Items"; 2000, Auction Bytes, 4 pages.
Stockel, Anna; "Securing Data and Financial Transactions"; 1995, Institute of Electrical and Electronics Engineers 29th Annual Conference, pp. 397-401.
Stoutenburg—Method & System for Performing Money Transfer Transactions—10-289802—no date, 30 Pages.
Strean, LitleNet, BBN, and KPMG Announce Industry-Wide Initiative to Enable Wide-Scale Software Electronic Commerce; 1996, News Release, 6 pages.
Survey of services; 1960, pp. 2-31.
The Western Union Telegraph Company: Delivery Department Instructions; 1926, Commercial Bulletin No. 9-A, 2 pages.
The Western Union Telegraph Company: Instructions for Receiving Clerks; 1929, Commercial Bulletin No. 37-A, 2 pages.
The Western Union Telegraph Company: Rules for Money Transfer Service; 1908, pp. 3-25.
The Yellow Blank is Correct for every social need; 1930, Western Union Booklet, 2 pages.
The Yellow Blank: When, Why, How to Use It; 1934, 5 pages.
To send a Quick Collect Payment; sample form, no date, 1 page.
Transfers require ID made by telegraph; 1895, Tariff Book, 4 pages.
Transpoint, "The Way to Pay Online", downloaded from website http://www.transpoint.com/ on Feb. 10, 2000, 12 pages.
U.S. Appl. No. 11/758,101, filed Jun. 5, 2007, Kurt L. Hansen et al.
VeriFone Finance, "Fast, Low-Cost Transaction Automation at the Point of Service", Jan. 1999, 2 pages.
VIPS Introduces MCSource to Managed Healthcare Industry; 1996, VIPS Healthcare Information Systems News Release, 2 pages.
VisionPLUS Consumer Payment Solution Overview, no date, 2 pages.
Wermer, Sandra; "A million credit card transactions in five hours"; 1997, Primeur, 2 pages.
Western Union—Now, using our service is even more rewarding; no date, 4 pages.

Western Union—Quarterly Report 3rd Quarter 1975—4 pages.
Western Union—Some Quick Facts about Quick Collect; no date, p. 1.
Western Union and Continental Airlines Introduce New Quick and Easy Cash Payment Option When Booking Flights; 2004, Press Release, 4 pages.
Western Union- BidPay-Buyer FAQs, 1999-2003, 7 pages.
Western Union Creates Phone Card with BLT Technologies; 1997, PR Newswire Association, 2 pages.
Western Union Financial Services Inc.: There's a lot to be said about the many advantages of the Quick Collect service. And look who's saying it; 1995, 4 pages.
Western Union Financial Services, Inc.: Benefits Quick Cash Agreement and Disclosure Statement; 1998, 2 pages.
Western Union Financial Services, Inc.: Cash Card Agreement and Disclosure Statement; 1998, 2 pages.
Western Union Gift Greetings; no date, 6 pages.
Western Union Hotel-Motel Reservation Service, no date, 1 page.
Western Union Money Orders More Popular Than Ever: 1942, Dots and Dashes, vol. 18, No. 3, 2 pages.
Western Union Money Transfer & more—Printed date Jun. 10, 2003, 9 pages.
Western Union Money Transfer Service: Messages with money orders and telephone money order, Feb 1, 1920, 4 pages.
Western Union Money Transfer Services, Send Money Online, Money Orders, Send Telegrams; http://www.westernunion.com/info/osCompareMoneyMessage.asp, 2005, 3 pages.
Western Union New Supplement: Money Orders delivery through Mailgram: 1975, 2 pages.
Western Union News Supplement: Automatic travelers checks using Western Union; 1975, 2 pages.
Western Union Payment Services, Bidpay and Quick Collect, Online Bill Payment, Online Auction Payments; http://www.westernunion.com/info/osComparePayment.asp, 2005, 2 pages.
Western Union Products and Services: a brief description; 1960, 22 pages.
Western Union Quick Collect: First Data Corporation; 2000-2001,2004; 2 pages.
Western Union Quick Collect: The Fastest way to collect good funds; 1999, 11 pages.
Western Union Quick Collect: The most agents, the most locations, the most experienced; 2000, 2 pages.
Western Union Quick Collect; 3 Easy Ways to Send a Payment: In Person, Online or by Phone!; no date, 2 pages.
Western Union SwiftPay Selected by Sheakley Uniservice to Complete W-2 Reprint Transactions; 2000, PR Newswire Association, 2 pages.
Western Union Telegraph Company; 1933, Money Order Message, 17 pages.
Western Union/Money Zap: Send and receive money easily over the internet; http://www.moneyzap.com/main.asp, printed Dec. 1, 2000, 23 pages.
Western Union's Would-Be Rival; 1990, American Banker, 1 page.
Western Union—Money Transfer Service—Feb. 1, 1920 10th Edition—pp. 119 & 120.
When you're helping a customer make a crucial payment there's no room for guesswork; 2002, Western Union's Professional Collector, 3 pages.
Why Send Your Customers Across Town When You Can Send Them Next Door? 2005, 1 page.
Wijnen, Rene; You've Got Money!; 2000, Bank Technology News, vol. 13, No. 6, 4 pages.
x.com, Do More with Your Money, downloaded from website http://www.x.com., Feb. 7, 2000, 5 pages.
XP-002347909—Western Union Announces ATM Card Payout for Money Transfer Transactions—Oct. 22, 2001, p. 1.
You're sending more than a payment: Point-of-Sale & Merchandising Support Advertising Materials, no date, 2 pages.

* cited by examiner

ATM SYSTEM FOR RECEIVING CASH DEPOSITS FROM NON-NETWORKED CLIENTS

BACKGROUND OF THE INVENTION

This disclosure relates in general to currency conversion at transaction machines, such as, for example, ATMs and, but not by way of limitation, providing currency and/or transaction cards in a first currency in response to receiving cash in a second currency amongst other things.

Travelers traveling in foreign countries using foreign currency often leave with cash in the foreign currency. In some situations, travelers don't have time to visit banks or currency exchangers prior to departing. Similarly, travelers may be unfamiliar with a foreign country and not know where or how to convert funds into native currency. In other situations, the amount of foreign currency is small and may not justify the time or burden of exchanging the currency into native currency. Moreover, exchange rates between a foreign currency and a native currency can be unfavorable within the native country. Not only are exchange rates within the native country unfavorable, most banks, native or foreign, do not offer currency exchange. Accordingly, travelers often take a lose by not converting foreign currency into native funds.

BRIEF SUMMARY OF THE INVENTION

In one embodiment, the present disclosure provides a method for depositing foreign funds into a native account using a foreign Automated Teller Machine (ATM), for example, at a place of embarkment or disembarkment. The method includes receiving a financial account number at a foreign ATM from a consumer for a native financial account. The account number may also be received from a credit card, a debit card, an ATM card, a bank card, a gift card, a phone card, a cash card, and/or a stored value card provided by the consumer. The card may also be a contactless card. The account number may include a primary account number (PAN) and/or a bank identification number (BIN). The ATM may query the financial institution that issued the ATM card to determine the native currency type. In another embodiment, the ATM may determine the native currency type based on the BIN and/or other information on the card.

Foreign cash may also be received at the ATM. The ATM may also receive exchange rate information. The exchange rate information may be received periodically and stored electronically in a file or table. In other cases exchange rate information may be requested by the ATM through the network. A complete exchange rate table may be sent or the exchange rate for the exchange from foreign to native currency. The exchange rate may include deposit fees for the ATM managing financial institution, the receiving financial institution, and/or the financial institution managing the network. The ATM computes the amount of equivalent native cash based on the exchange rate and the amount of foreign cash deposited. The exchange rate may include fees for ATM owning financial institution, the financial institution associated with the consumer's account and/or the financial institution operating the network over which the transaction is managed. Fees may also be deducted from the native currency amount. The consumer may then be presented with the details of the transaction, for example, the ATM may display the foreign cash amount, the converted native cash amount, the exchange rate, and/or fees to the consumer. The consumer may then elect to proceed with the transaction or withdraw. If the consumer chooses to proceed, then the native currency amount is deposited in the consumers financial account. An ACH settlement may be used to transfer the funds into the consumer's account. In another embodiment, the network financial institution may front the funds to the consumer's account and through an agreement with the foreign financial institution operating the ATM receive funds in the proper currency from the foreign financial institution.

A method for providing a transaction card associated with a native currency in exchange for foreign funds at a foreign transaction machine is disclosed according to one embodiment of the invention. A consumer is provided with a selection of a plurality of transaction cards from which they may select. The transaction cards may include stored value cards and/or gift cards issued for restaurants, stores, online services, airlines, etc. The transaction card may be a PIN debit card and or a stored value credit card. At the ATM the consumer may select one of the transaction cards, a native currency type and exchange rate information between the foreign currency and the native currency. The consumer may provide foreign funds to the ATM through a currency or coin reader. The ATM may calculate a native funds amount according to the exchange rate. The ATM may also deduct fees for the transaction. The consumer may be provided with transaction information prior to finalizing the transaction. The ATM may also apply the native funds to the selected transaction card and then provide the card to the consumer. In another embodiment of the invention, the consumer may select to have funds in a second foreign currency applied to the transaction card. Transaction cards may be loaded with any currency desired by the consumer.

The transaction card machine may be located at a place of embarkment or disembarkment such as, for example, an airport, a train terminal, a subway terminal, a seaport; a border crossing terminal; and a facility near a border crossing.

A method for depositing foreign funds in a first transaction machine and receiving native funds from a second transaction machine is disclosed according to one embodiment of the invention. A first transaction machine, for example an ATM, receives cash in a first currency in the amount of a first currency amount. The first transaction machine may then provide the consumer with a transaction identifier. The transaction identifier identifies the transaction and allows the consumer to retrieve funds in a second currency from another participating transaction machine. The transaction identifier may be printed on a receipt and may include a security code. Moreover, the first transaction machine may request and receive a security code, for example, a password or personal identification number (PIN). The transaction identifier may also include a magnetic stripe, RFID chip or bar code that is associated with the transaction.

The consumer may present the transaction identifier at a second transaction machine. The second transaction machine may operate with a second currency. The second transaction machine identifies the first currency and retrieves exchange rate information between the first currency and the second currency. The exchange rate may include fees for the financial institutions involved with the transaction. The first currency amount is then converted into a second currency amount and cash in the second currency may the be provided to the consumer. The second transaction machine may query the consumer for a password or PIN associated with the transaction prior to disbursing the funds.

The first transaction machine may be located at a place of embarkment and the second transaction machine may also be located at a place of disembarkment. The places of embarkment and disembarkment may include an airport, a train terminal, a subway terminal, a seaport; a border crossing terminal; and a facility near a border crossing. The first and second transaction machines may also be located at a point of sale location, for example, a hotel, a merchant site, a supermarket, convenience store, etc. In some embodiments, the second transaction machine may actually be a payment terminal, point of sale device, ATM, or electronic cash register with the ability, for example, to receive a transaction identifier and dispense cash and or settle a purchase.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
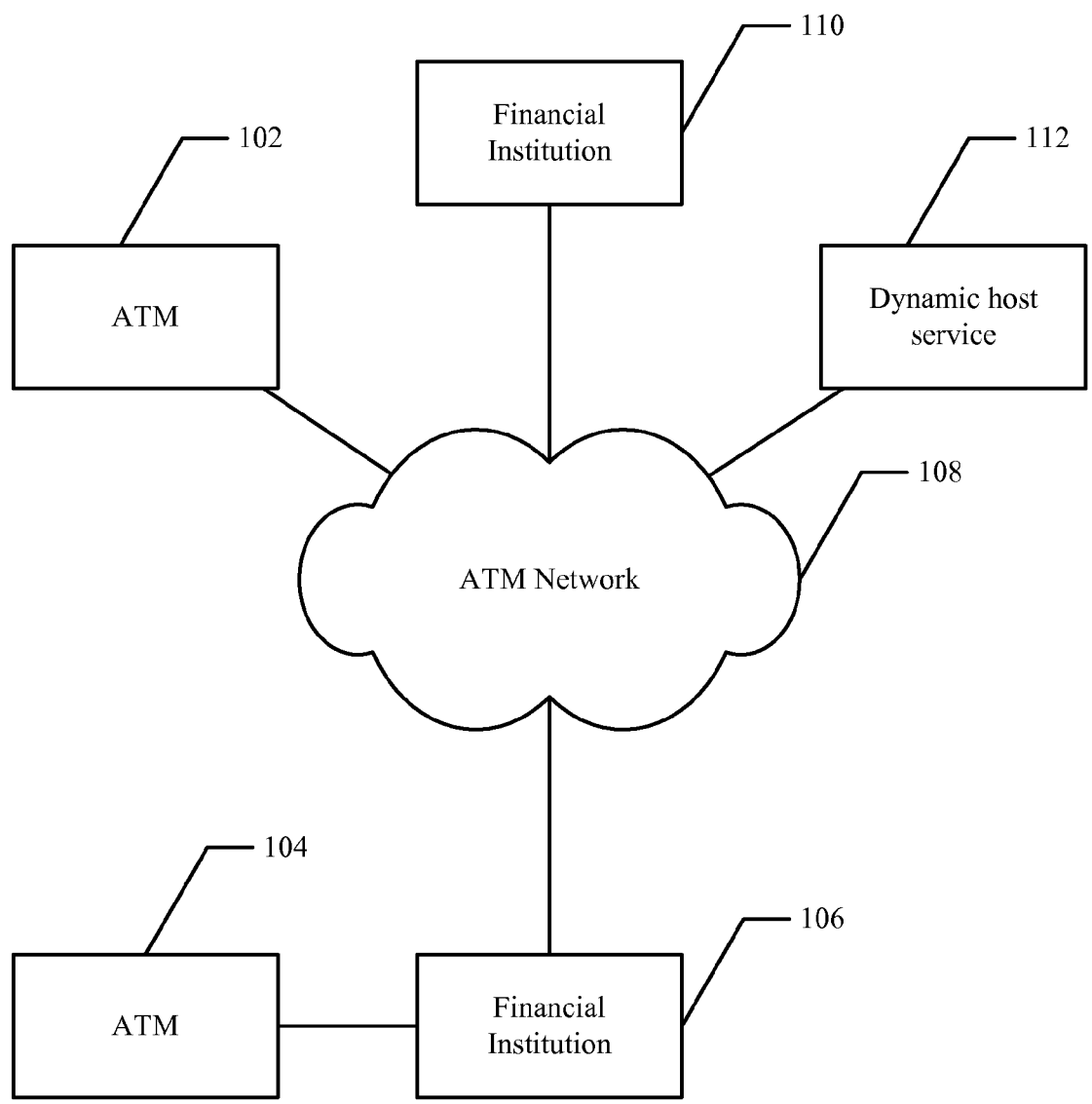
FIG. 1 illustrates a system that may be used to provide currency conversion capabilities in an ATM according to one embodiment of the invention.

In the appended figures, similar components and/or features may have the same reference label. Where the reference label is used in the specification, the description is applicable to any one of the similar components having the same reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

As used throughout this disclosure, the term native currency refers to the currency associated with a transaction card. A foreign currency is currency other than the native currency.

For example, the Canadian dollar is the native currency for a consumer living in Canada using a transaction card issued in Canada, and the Euro, Peso and U.S. Dollar are foreign currency. Similarly, a native transaction machine refers to a transaction machine that primarily operates with funds in the native currency. A foreign transaction machine primarily operates on funds in a foreign currency.

Embodiments of the present invention may provide transaction machines, for example, ATMs, in foreign countries that deposit native funds in a consumer's account and/or provide a transaction card with native funds assigned thereto in exchange for foreign funds. Embodiments of the invention may also provide a transaction identifier in exchange for foreign funds at a foreign transaction machine that may be used to retrieve native funds from a native transaction machine.

For example, a consumer from the United States may travel to France. While in France the consumer may use Euros as tender and have a handful of Euros in their pocket when leaving France. Upon return to the United States the consumer may wish to convert the Euros into dollars or deposit them into an account held in the Untied States. According to embodiments of the invention, the consumer may simply deposit the Euros into an ATM, for example, at the airport. By providing an ATM card issued from a Unites States bank, the ATM may apply an exchange rate to the funds and deposit United States Dollars into the consumers account associated with the ATM card. Other embodiments of the invention provide transaction cards, for example a stored value card, in native currency in exchange for foreign currency. A transaction identifier may also be provided in exchange for foreign currency. The transaction identifier may the be used in nay other country to receive funds in another countries native currency. The transaction identifier may be included within an RFID chip.

The transaction machines according to embodiments of the invention may be located at points of embarkment and disembarkment. For example, the transaction machines may be located in airports, seaports, border crossing, subway station, and/or train terminals.

FIG. 1 illustrates a system that may be used to provide foreign currency deposit and conversion capabilities in an ATM. The system includes ATMs 102, 104. ATM 102 has a direct communication coupling to the ATM network 108, while the ATM 104 is communicatively coupled to the ATM network 108 via a server at a financial institution 106 associated with the ATM 104. The ATM network 108 may be used to obtain information and authorization for an ATM 102, 104 to perform transactions requested by a customer of the ATM 102, 104. Thus, the ATM network 108 is able to communicate with a financial institution 110 associated with the ATM customer's financial account. By way of example, ATM network 108 may be a network, such as the NYCE® network, the Pulse® network, the STAR® network, and the like. The ATM network 108 may be used to verify a customer's authentication information (e.g., financial account and personal identification number (PIN)) and to provide authorization to an ATM 102, 104 to perform a transaction, such as a withdrawal of funds from a financial account or a transfer of funds from a first financial account to a second financial account. The ATM network may also be used to deposit funds into the customer's account. ATM network 108 may also be used to obtain information on the customer's financial account, such as the account balance. The information and authorization may be provided directly to some ATMs 102 and may be provided to other ATMs 104 via a financial institution server 106. In some instances, the customer's financial account may be maintained at the financial institution 106 associated with the ATM 104. In these instances, financial institution 106 may provide the authorization and other information needed by the ATM 104 without using ATM network 108. It should be appreciated that the system may include many more ATMs 102, 104 and financial institutions 106, 110 than illustrated in FIG. 1.

ATM network 108 is communicatively coupled to Currency Recognition and Exchange Service 112. Currency Recognition and Exchange Service 112 may be a service that is used to provide information on a currency associated with an ATM customer's financial account. Additionally, Currency Recognition and Exchange Service 112 may be used to provide exchange rates to an ATM 102, 104 via ATM network 108. In some embodiments, Currency Recognition and Exchange Service 112 may be used to provide currency exchange information for more than one ATM network 108. Alternately, Currency Recognition and Exchange Service 112 may be a component of ATM network 108. In some embodiments, Currency Recognition and Exchange Service 112 may provide the currency and exchange information dynamically. For instance, the information may be provided when it is requested by financial institution 106 or ATM network 108 on behalf of ATM 102, 104. Alternately, Currency Recognition and Exchange Service 112 may periodically provide currency recognition and exchange information to a server residing on ATM network 108, ATM 102/104, and/or financial institutions 106, 110. By way of example, the information may be transferred as one or more files using file transfer protocol (ftp). The file transfer may be initiated by either the Currency Recognition and Exchange Service 112 or at the initiative of the component on the system receiving the files (e.g., financial institution 106, server on ATM network, etc.). Moreover, the Currency Recognition and Exchange Service 112 may be connected to a public network, such as the Internet, and receive exchange rate information from public sources or from fee based sources.

Figure 2:
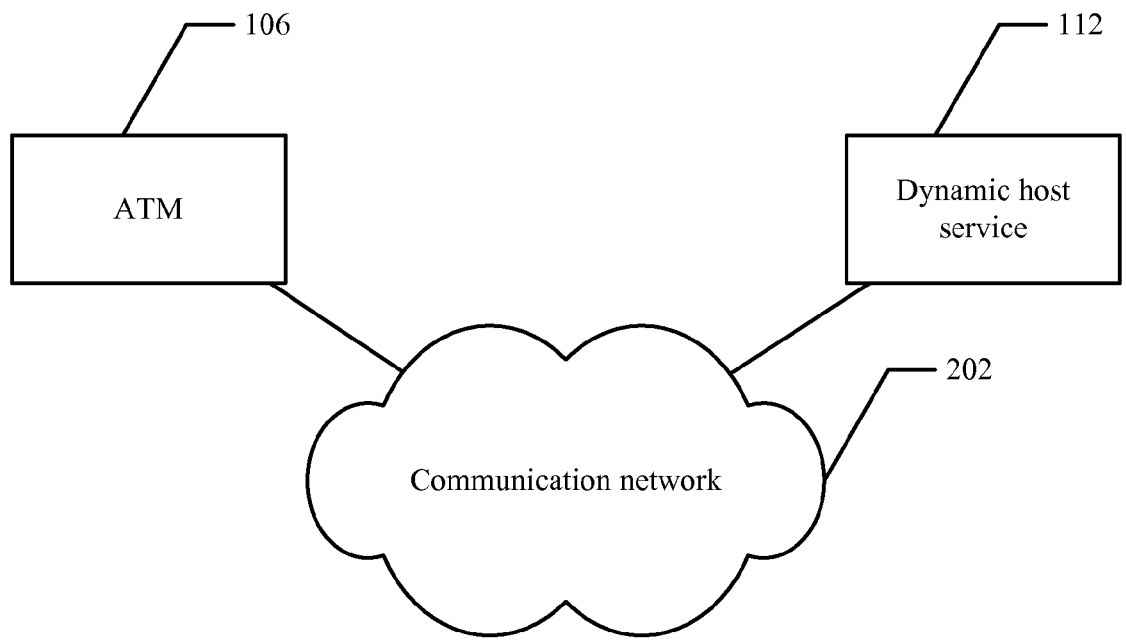
FIG. 2 is a block diagram illustrating an exemplary communication coupling to a currency recognition and exchange service that may be used to provide currency conversion capability in an ATM according to one embodiment of the invention.

FIG. 2 illustrates a second exemplary communication coupling between financial institution 106 and Currency Recognition and Exchange Service 112. In this embodiment, financial institution 106 is communicatively coupled to Currency Recognition and Exchange Service 112 via a communications network 202, such as a wide area network (WAN). Thus, financial institution 106 may obtain currency recognition and exchange rate information from Currency Recognition and Exchange Service 112 without using ATM network 108. As previously described, financial institution 106 may obtain the information dynamically, as requested by ATM 104, or may locally store information which is periodically transmitted to the financial institution 106 from Currency Recognition and Exchange Service 112 (e.g., via ftp file(s)) or other transfer protocols.

It should be appreciated that various other configurations than those illustrated in FIGS. 1 and 2 may be used to provide currency recognition information and exchange information to ATMs 102, 104. For instance, either or both ATMs 102, 104 may be in direct communications with Currency Recognition and Exchange Service 112. Alternately, Currency Recognition and Exchange Service 112 may be a component of ATM 102, 104 or may be software executing on a financial institution server 106, 110. In these embodiments, Currency Recognition and Exchange Service 112 may periodically obtain exchange rate information and currency recognition information from one or more sources of this information.

Figure 3:
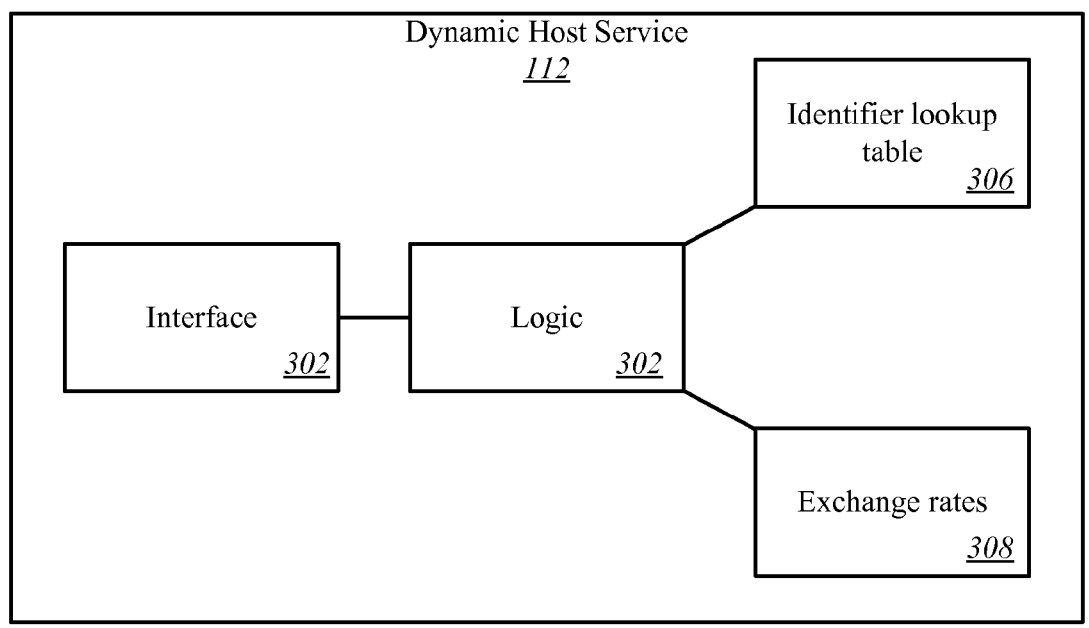
FIG. 3 is a block diagram illustrating an exemplary embodiment of the Currency Recognition and Exchange Service in FIG. 1 and FIG. 2 according to one embodiment of the invention.

FIG. 3 illustrates one exemplary embodiment of a Currency Recognition and Exchange Service 112. Currency Recognition and Exchange Service 112 includes a communications interface 302. Communications interface may be communicatively coupled to a server residing on ATM network 108, one or more financial institutions 106, 110 and/or one or more ATMs 102, 104. In some embodiments, Currency Recognition and Exchange Service 112 may be used to provide currency recognition and/or exchange information to an ATM 102, 104 at the request of another component, such as ATM network 108 or financial institution 106. Alternately, the information may be provided directly to an ATM 102, 104. As will be described in further detail below, interface 302 may be used to receive financial institution identifier portions of financial account identifiers and to communicate a determined currency associated with the financial account. Interface 302 may also further be used to communicate exchange rates to convert from a first currency to a second currency.

Currency Recognition and Exchange Service 112 further includes logic 304, identifier lookup table 306, and exchange rate information 308. Logic 304 is communicatively coupled to interface 302, identifier lookup table 306, and exchange rate information 308. By way of example, logic 304 may be machine-executable instructions, such as a software program. Logic 304 may be used to determine a currency type associated with a financial account using data, such as identifier lookup table 306. Additionally, logic 304 may be used to determine exchange rates by using the exchange rate information 308.

Identifier lookup table 306 and exchange rate information 308 may be stored in one or more databases. The database(s) may be any type of structure that may be used to store information, such as relational databases, internal software lists, text files, spreadsheet files, and the like. Identifier lookup table 306 may contain information associating financial institution identification numbers (e.g., BINs) with a country and/or currency. In other embodiments, the system determines the native currency based on the card number. The card number details the financial network, which, in turn, provides the native currency used with the card. In other transaction cards, such as, for example, stored value cards, a currency identifier is embedded in the magnetic strip. Other unique identification numbers, such as the ATM card number or customer's financial account may also or alternately be associated with a country and/or currency. Exchange rate information 308 may store information on exchange rates that may be used to convert from a first currency to a second currency. In embodiments in which the lookup table maps financial institution identification numbers to a country, additional information may be stored which maps countries to currencies. In some embodiments, the identifier lookup table 306 may map a range of financial institution identification numbers to a country and/or currency. In these embodiments, the information in the database(s) may further include an exception table (not shown) to map financial institution identification numbers to a currency and/or country different than the one indicated in the associated range of the lookup table.

In the configuration described above, different components were described as being communicatively coupled to other components. A communicative coupling is a coupling that allows communication between the components. This coupling may be by means of a bus, cable, network, wireless mechanism, program code call (e.g., modular or procedural call) or other mechanism that allows communication between the components. Thus, it should be appreciated that logic 304, identifier lookup table 306, and exchange rate information 308 may reside on the same or different physical devices. It should also be appreciated that in alternate embodiments, Currency Recognition and Exchange Service 112 may contain additional or fewer components than illustrated in FIG. 3.

As previously described, in alternate embodiments, currency recognition information, such as identifier lookup table 306, and exchange rate information 308 may be periodically provided to a server residing on ATM network 108, financial institution 106, and/or ATMs 102, 104. For instance, files may be periodically transferred or otherwise made available to one or more of these components 108, 106, 102, 104. It should be appreciated that in these embodiments, appropriate logic (e.g., program code) may also reside on the component 108, 106, 104, and/or 102 having the currency recognition and exchange information. The component logic may function similar to logic 304 and may use the transferred data to perform currency recognition and provide exchange rate information at the request of an ATM 102, 104, or additional logic resident to the ATM 102, 104.

Figure 4:
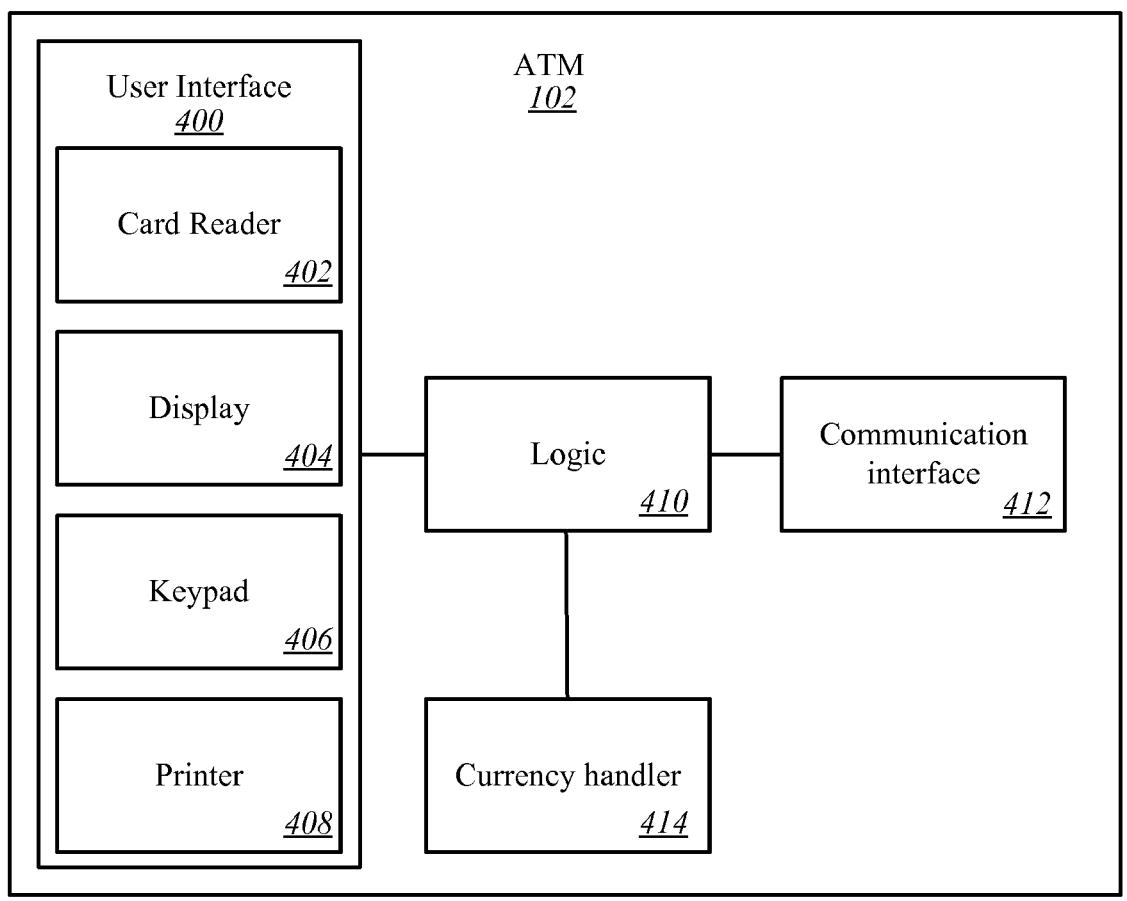
FIG. 4 is a block diagram of an exemplary ATM that may be used to conduct financial transactions in a currency not native to the ATM according to one embodiment of the invention.

FIG. 4 illustrates an exemplary block diagram of an ATM 102 that may be used to provide currency conversion information to customers. ATM 102 includes a user interface 400. User interface 400 may comprise multiple components, such as card reader 402, display 404, keypad 406, and printer 408. Card reader 402 may be used to receive a customer's ATM card and obtain a financial account number from the ATM card. Display 404 may be used to prompt the customer for responses needed to perform a transaction and to display information to the customer. Keypad 406 may be used to receive input from the customer, such as a personal identification number (PIN) associated with the customer's financial account, transaction selections, dollar amounts for transactions (if applicable), and other information related to a customer's transaction with the ATM. Additionally, as will be described in further detail below, display 404 may be used to display a currency type selection for the transaction and keypad 406 may be used to receive the customer's currency type selection. User interface 400 may also include a printer 408 that may be used to print a receipt of the transaction, and in some embodiments, the customer's remaining account balance. Currency reader 414 may be used to receive currency from a consumer. The currency handler 414 may include a coin acceptor, a bill acceptor and/or a bill validator. The currency handler 414 may receive currency from a user for deposit with in an account and communicate the total currency received to the logic 410. The currency handler may also include a cash and/or coin dispenser.

ATM 102 may further include logic 410 and communications interface 412. Logic 410 may be used to process a financial transaction requested by a customer of the ATM 102. By way of example, the financial transaction may be a withdrawal request, a balance transfer request, a deposit request, a purchase request (e.g., to purchase stamps, telephone calling cards, etc. using funds available in the customer's financial account), or other type of request that may be performed at an ATM. Logic 410 may receive information from user interface 400 and use communications interface 412 to communicate with ATM network 108.

Communications interface 412 is communicatively coupled to a server on ATM network 108. Logic 410 may use communications interface 412 to request authentication of a customer's financial account number received from user interface 400. In some embodiments, the authentication request transmitted to the ATM network 108 may also include a PIN which was received from the customer. Additionally, logic 410 may use communications interface 412 to request authorization of a transaction initiated by the customer. Other information used to perform a financial transaction may also be requested and received using communications interface 412.

As will be described in further detail below, logic 410 may also be used to process at least a part of a financial transaction requested by the customer in a foreign currency which is a foreign currency associated with the ATM 102 and not a native currency associated with the customer's financial account. For instance, logic 410 may receive a request to deposit foreign currency in the ATM 102 and have the funds deposited in an account associated with an ATM card. Exchange rate information for exchanging funds in a foreign currency to a native currency may be provided by the Currency Recognition and Exchange Service 112 via the ATM network 108, or from information accessible to ATM 102. In an alternate embodiment, the information may be stored locally at ATM 102. Logic 410 may use the exchange rate information to convert from the foreign currency to the native currency and display details of the transaction in the currency which is foreign to the ATM, but native to the customer and ATM. Alternately, logic 410 may not be provided with exchange rate information and may instead use communications interface 412 to obtain converted transaction amounts.

The above description described an ATM 102 that communicates with an ATM network 108 to obtain authentication, authorization, and other transaction information. It should be appreciated that in alternate embodiments, communications interface 412 may communicate with a financial institution 106 to obtain information used to process a transaction, including currency recognition information and exchange rate information. It should also be appreciated that in alternate embodiments, ATM 102 may comprise fewer or additional components than described above. For instance, user interface 400 may not include a keypad 406, but instead may include a touch pad to receive information from a customer.

Figure 5:
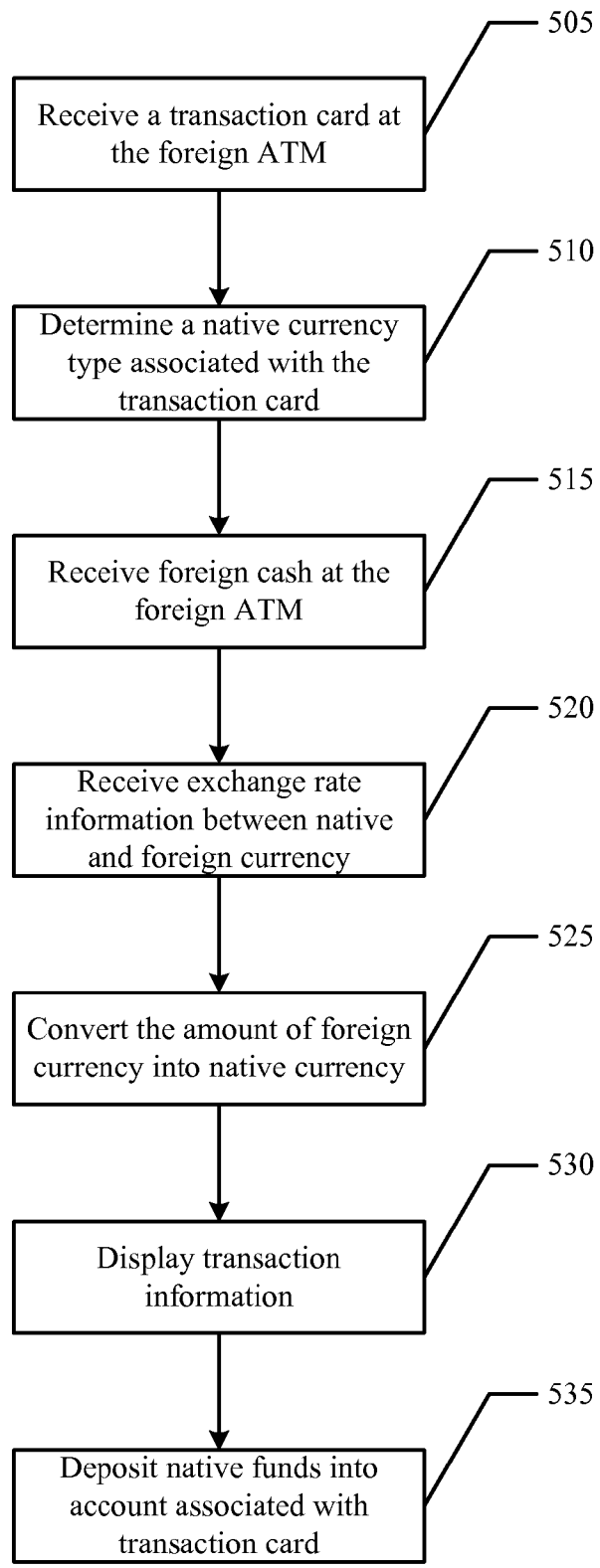
FIG. 5 is flowchart of a method for depositing foreign funds into a native account at a transaction machine according to one embodiment of the invention.

FIG. 5 shows a flowchart of a method for placing foreign currency in a foreign ATM and having funds deposited in a native account according to one embodiment of the invention. A consumer, for example, a business traveler, upon leaving a country with foreign currency may want to deposit the foreign currency into an account held by the consumer. The consumer may approach an ATM with foreign currency deposit capabilities to deposit the funds. Such an ATM has been described above.

The ATM may receive an account number from the consumer. The account number may be read from a transaction card that was provided by the consumer at block 505. The transaction card may include a credit card, a debit card, an ATM card, a bank card, a gift card, a phone card, a cash card, or a stored value card. The ATM may require authentication and/or identification of the consumer prior to proceeding with the transaction. Such authentication may require, for example, entry of a personal identification number.

The ATM may then determine the native currency associated with the transaction card at block 510. The identifier lookup table 306, may be used to determine the native currency associated with the transaction card. The consumer may then deposit foreign currency into the ATM at block 515. The ATM may then receive exchange rate information at block 520. The exchange rate information may include exchange rate information for exchanging foreign funds into native funds. The exchange rate may include a rate adjustment that is included as a fee for the transaction. The ATM may receive periodic updates to an exchange rate table located on the ATM. According to another embodiment of the invention, the ATM may communicate with an external server for exchange rate information as descried in U.S. patent application Ser. No. 11/283,532, entitled "Derivative currency-exchange transactions," filed 18 Nov. 2005 and U.S. patent application Ser. No. 10/286,006, entitled "Stored value currency conversion systems and methods," filed 1 Nov. 2002, which are incorporated herein by reference in their entirety for all purposes.

Fees may be deducted from the deposited funds in either the foreign or native currency denominations. The fees may also be calculated as part of the exchange rate. The financial institution associated with the transaction machine may charge a fee. The financial institution associated with the consumer's account may also charge a fee. Furthermore, the network used to transfer the money may also deduct fees from the transaction amount.

The foreign currency may then be converted into the native currency according to the exchange rate at block 525. The system may then present the exchange rate information to the consumer through the ATM user interface 530. For example, the ATM may present to the consumer the foreign currency amount, the exchange rate, fees, and the native currency amount. The consumer may then chose whether or not to continue with the transaction based on the information presented through the user interface. If the consumer chooses to continue, the native funds are deposited into the account associated with the transaction card at block 535. The deposit may use the ATM network to transfer the funds to the account. Moreover, the transaction may not settle for a period of time, for example, 24-48 hours, from the time of deposit. The ATM may provide the consumer with a receipt showing the foreign currency amount, the exchange rate and the deposited amount.

The transaction card may include a credit card, a debit card, an ATM card, a bank card, a gift card, a phone card, a cash card, or a stored value card. Moreover, the transaction card may be a contactless card or other device that communicates account information to a transaction machine; for example, a wireless phone. The transaction card may also include and RFID chip.

The ATM may use the automated clearing house (ACH) financial network according to one embodiment of the invention. At the ATM the consumer may provide authorization to deposit funds into their account. The authorization may require reading a terms of the agreement and typing or selecting some form of an "I agree" statement through the user interface. Once authorization is acquired, the ATM may create an ACH entry to be given to an Originating Depository Financial Institution (ODFI), which can be any financial institution that does ACH origination. The bank that operates the ATM may constitute an ODFI. This ACH entry is then sent to an ACH Operator (for example, the Federal Reserve) and may be passed on to a Receiving Depository Financial Institution (RDFI), where the funds are deposited in consumer's account.

Figure 6:
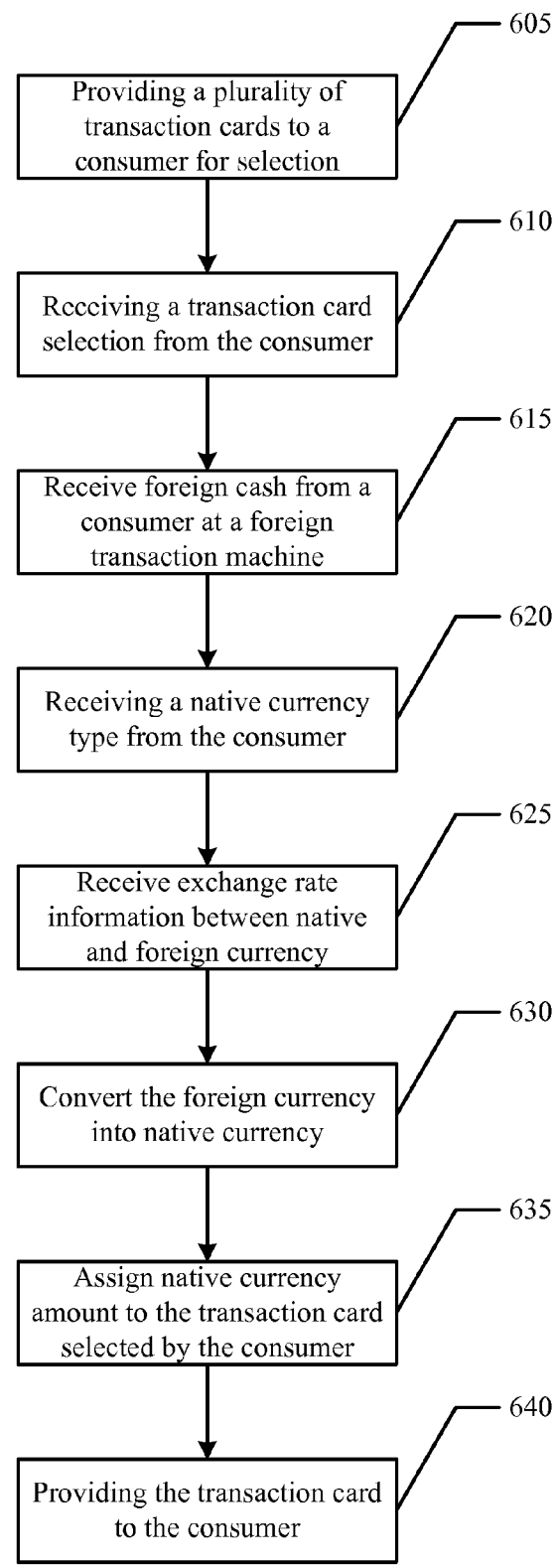
FIG. 6 is flowchart of a method for providing a transaction card in native funds after receiving foreign currency at a transaction machine according to one embodiment of the invention.

FIG. 6 is flowchart of a method for providing a transaction card in a second currency after receiving first currency at a transaction machine according to one embodiment of the invention. A transaction machine, such as an ATM or a vending machine, may provide transaction cards to consumers with second funds deposited thereon after receiving first currency. A plurality of transaction cards may be presented to the consumer in a selectable manner at block 605. For example, a transaction machine may present stored value cards and/or gift cards from a variety of vendors for selection. The user may then choose a selection from the presented transaction cards that is received at the transaction machine at block 610. The consumer may then deposit first currency into the transaction machine at block 615. The consumer may also select a second currency type at block 620. Blocks 610, 615 and 620 may occur in any order.

Exchange rate information may be received for converting the first funds into second funds at block 625. The first funds are then converted according to the exchange rate at block 630. Transaction information may be presented to the consumer, such as, first currency amount, exchange rate, fees, and/or second funds amount. The consumer may be presented with the option to proceed with the transaction or withdraw. If the consumer proceeds, the second funds are applied to a transaction card that is selected by the consumer at block 635. The transaction card with the funds assigned is provided to the consumer.

Figure 7:
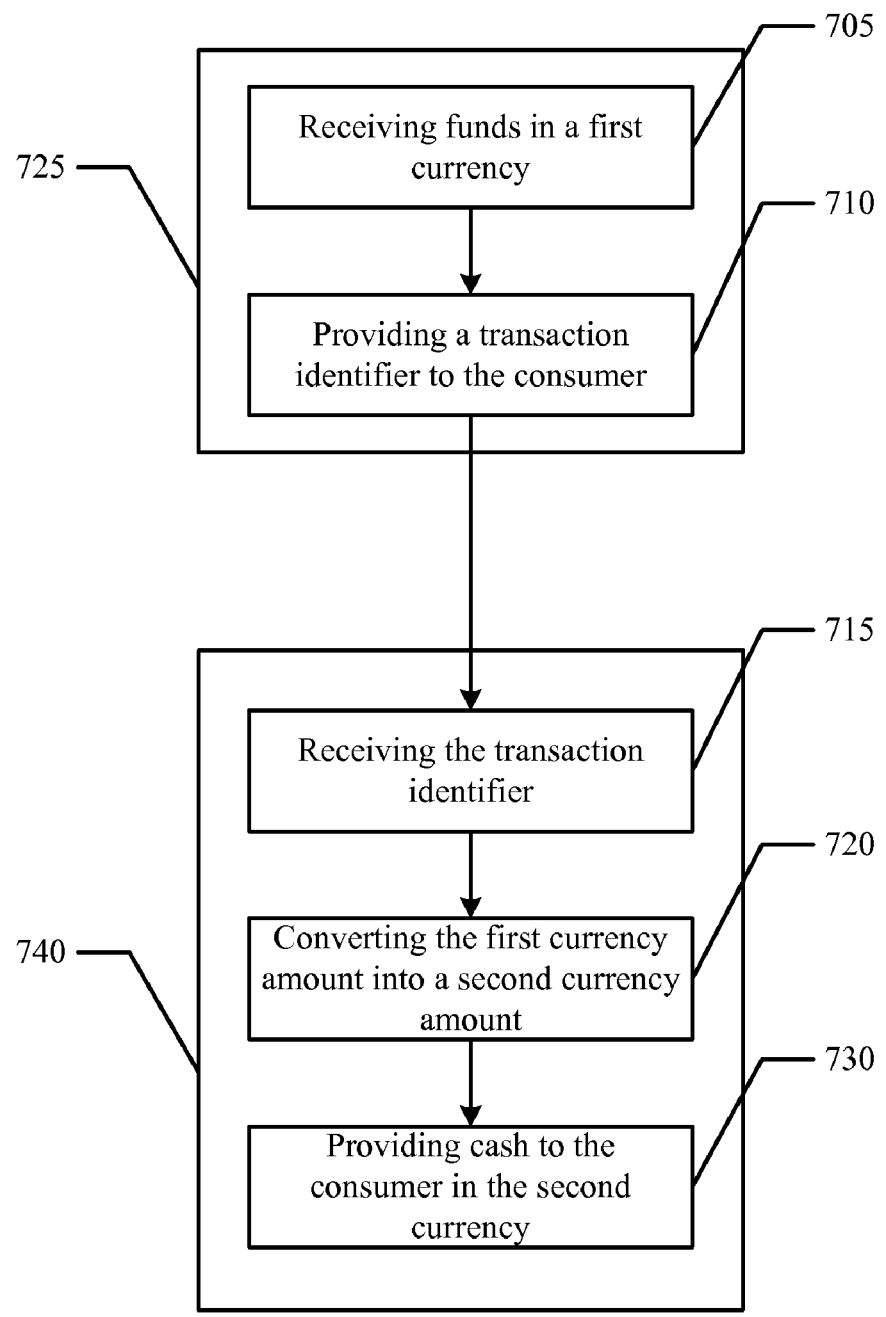
FIG. 7 is flowchart of a method for depositing funds in a first currency into a first transaction machine and receiving funds in a second currency at a second transaction machine according to one embodiment of the invention.

FIG. 7 is flowchart of a method for depositing funds in a first currency into a first transaction machine 725 and receiving funds in a second currency at a second transaction machine 740 according to one embodiment of the invention. Funds are received at the first transaction machine 725 in a first currency at block 705. The first transaction machine may then require the consumer to provide a password, personal identification number (PIN) or other identifying information for transaction security. The foreign transaction machine may then provide a transaction identifier at block 720 to the consumer that identifies the transaction and the which the consumer may use at a second transaction machine to retrieve the funds. The transaction identifier may include a bar code, RFID chip, or magnetic stripe that is readable at a second transaction identifier.

The consumer may then travel to another location that uses a second currency as tender, approach a second transaction machine, and provide the transaction identifier to the second transaction machine at block 715. The consumer may be required to enter identifying information like a password, PIN, answer a security question and/or identify the previous currency type or location as part of security measures. The currency is converted into the second currency according to an exchange rate at block 720. The second transaction machine may then provide cash in the second currency to the consumer at block 730.

In another embodiment of the invention, the consumer may provide funds at first transaction machine in a first currency and receive a transaction identifier. Accordingly, the consumer may take the transaction identifier to a second transaction machine and retrieve funds from the second transaction machine in currency native to the location where the second transaction machine is located. The second transaction machine may receive exchange rate information and provide funds in the native currency according to the exchange rate.

Fees may be deducted from the transaction value and applied to the financial institution running the first and/or second transaction machines as well as to the financial institution operating the network over which funds are transferred. The fees may be deducted at the first financial institution, the second financial institution and/r the network host computer. The fees may be deducted in any currency through currency exchange rates.

Figure 8:
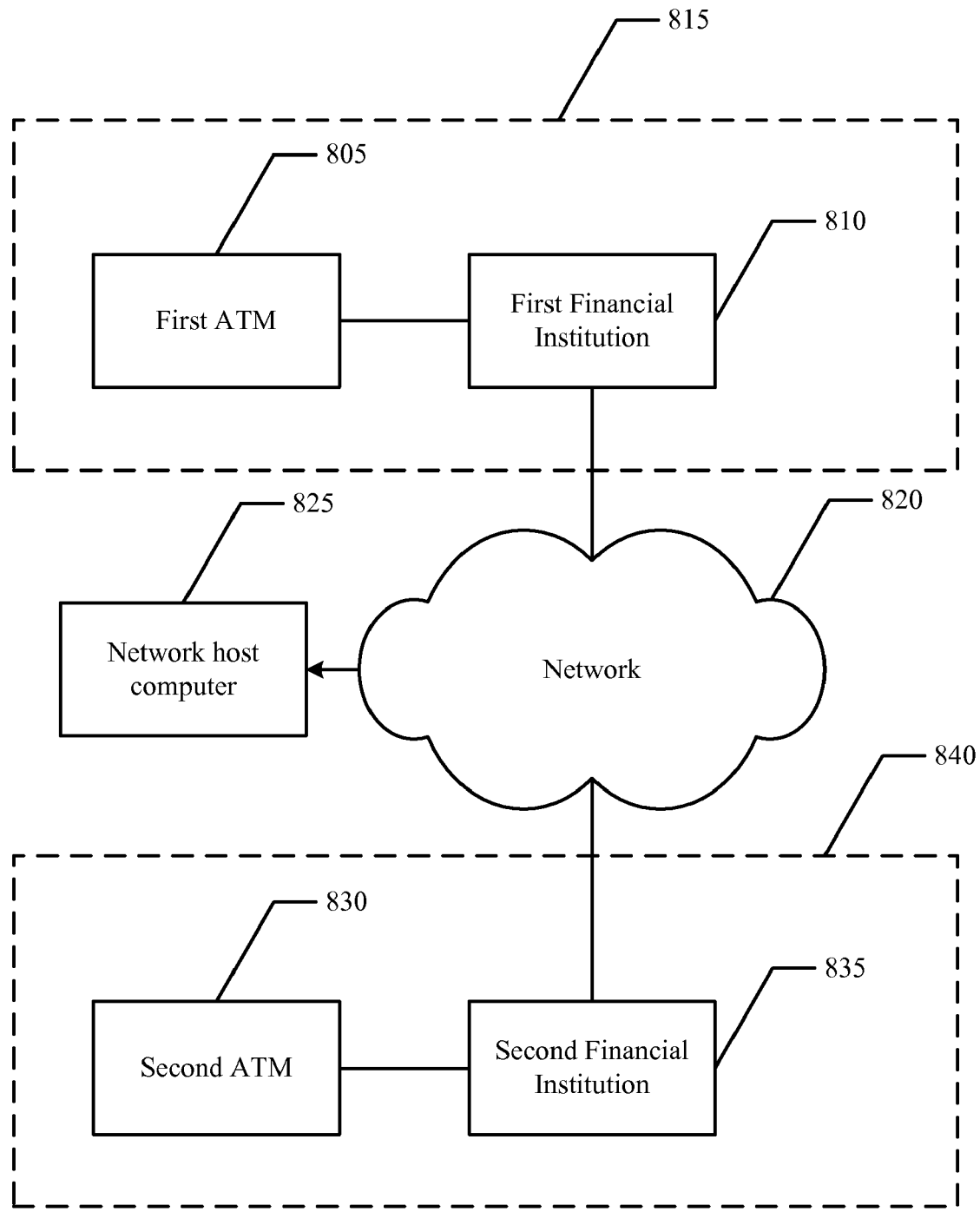
FIG. 8 is a block diagram of an exemplary embodiment that may be used for the method shown in FIG. 7 according to one embodiment of the invention.

FIG. 8 shows a block diagram of an exemplary system for implementing, among other things, the method shown in FIG. 7 according to one embodiment of the invention. A first ATM 805 is located in a first location 815 and associated with a first financial institution 810. The first location 815 may be a country that uses a first currency as tender. A second ATM 830 is located in a second location 840 and associated with a second financial institution 835. The second location 840 may be a country that uses a second currency as tender. The first financial institution 810 and the second financial institution 835 are linked through a network 820. The network may be any type of network between which the financial institutions may communicate transaction details and/or exchange rate information. The network 820 may include a network host computer 825 that may store transaction details. For example, the first ATM 805 may receive a deposit from a consumer. The first ATM 805 communicates the deposit amount and the transaction identifier to the first financial institution 810, which sends the information to the network 820 where it is stored at the network host computer 825. When the second ATM 830 receives a request for the funds, the network host computer 825 sends transaction details to the second ATM 825. The second ATM 830 performs a currency exchange and provides the funds in the second currency. The second financial institution 835 settles the transaction with the first financial institution 810 at some later point and may use the data stored in the network host computer 825 for settlement purposes.

For example, A consumer from the United States may be visiting the first location 810, for example France and may have accumulated a number of Francs. The consumer is leaving France for New Zealand and wishes to take the value of his money with him without the bother of visiting a bank or currency exchange. At the airport, the consumer simply approaches a participating ATM, selects a foreign money transfer option and deposits the Francs in the ATM. The consumer enters a secret code that is saved in the network and that must be used to retrieve the funds. The ATM provides the consumer with a transaction identifier that includes a code that may be used to retrieve the funds.

As a first example, when the consumer arrives in New Zealand, she may proceed to a participating ATM, select to retrieve foreign funds and enter the transaction identifier. The consumer may also enter their secret code for authorization. Whereupon the ATM retrieves exchange rate information, converts the funds to New Zealand Dollars, and provides the consumer with New Zealand Dollars according to the exchange rate. Fees may be deducted and applied to the banks associated with the ATMs and the network administrator. The bank associated with the ATM in New Zealand may request funds from the bank associated with the ATM in France. A fund transfer may occur between the banks to settle the accounts. The banks may settle their accounts at any time and in any way convenient to the banks.

As a second example, the consumer may only be in New Zealand for a brief period of time and may return to the United States. The consumer may retrieve her funds in the United States from a participating ATM as described above. As a third example, the consumer may return to France and retrieve the funds as described above and in the same currency as deposited. Based on the exchange rate and fees the retrievable funds may be less or greater than the amount deposited.

Large deposits at participating ATMs may be restricted. Moreover, government agencies may be alerted if money laundering is detected. The transaction may have a deadline when the funds will no longer be retrievable.

In another embodiment of the invention, a consumer may be provided with a transaction card in a first currency. The transaction card may be a stored value, gift card, prepaid credit card, or PIN debit card. At a transaction machine, the consumer may enter the transaction card and convert the loaded funds from a first currency to a foreign currency. A fee for such a conversion may be deducted from the funds on the card. At a second transaction machine, the consumer may enter the transaction card and convert the loaded funds from the second currency to a third currency. The consumer may forfeit the first transaction card and receive a second transaction card with the native currency information embedded within the cards magnetic strip. The consumer may also call a telephone number provide card information and convert the funds from a first currency to a second currency.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for depositing foreign funds into a native account using a foreign Automated Teller Machine (ATM), the method comprising:
   receiving, at a foreign ATM, a financial account number associated with a financial account maintained by a customer at a financial institution;
   determining a native currency type associated with the financial account; receiving, at the foreign ATM, foreign cash from the customer, wherein the total foreign cash received from the customer amounts to a foreign currency amount;
   receiving exchange rate information at the foreign ATM; converting the foreign currency amount into a native currency amount according to the exchange rate information;
   creating an automated clearing house entry at the foreign ATM for deposit into the financial account associated with the received financial account number;
   transmitting, from the foreign ATM, the automated clearing house entry to an originating depository financial institution; and
   depositing the native currency amount into the financial account.

2. The method according to claim 1, wherein the receiving, at a foreign ATM, a financial account number further comprises receiving at a foreign ATM a transaction card that includes a financial account number.

3. The method according to claim 2, wherein the transaction card is selected from the group consisting of a credit card, a debit card, an ATM card, a bank card, a gift card, a phone card, a cash card, and a stored value card.

4. The method according to claim 1, further comprising presenting transaction information to the customer prior to the depositing, wherein the transaction information includes the native currency amount.

5. The method according to claim 1, wherein the ATM is located at a place of embarkment.

6. The method according to claim 1, further comprising deducting a Ice for the transaction from the native currency amount.

7. The method according to claim 1, limber comprising deducting a fee for the transaction from the foreign currency amount.

8. The method according to claim 1, wherein the transaction card comprises a contactless transaction card.

9. A method for providing a transaction card associated with a native currency in exchange for foreign funds at a foreign transaction machine, the method comprising:
   providing a plurality of transaction cards to a consumer for selection;
   receiving at a foreign transaction machine, foreign cash from a customer,
   wherein the total foreign cash received from the customer amounts to a foreign currency amount;
   receiving a transaction card selection from the consumer;
   receiving a native currency type from the consumer;
   receiving exchange rate information;
   converting the foreign currency amount into a native currency amount according to the exchange rate information;
   assigning the native currency amount to the transaction card;
   creating an automated clearing house entry at the foreign ATM for deposit into a financial account;
   transmitting, from the foreign ATM, the automated clearing house entry to an originating depository financial institution;
   providing the transaction card to the consumer.

10. The method according to claim 9, further comprising providing the transaction card to the consumer.

11. The method according to claim 9, wherein the foreign transaction machine is located al a place of embarkment.

12. The method according to claim 1, wherein the place of embarkment is selected from the group consisting of an airport, a train terminal, a subway terminal, a seaport; a border crossing terminal; and a facility near a border crossing.

13. The method according to claim 9, further comprising deducting a lee for the transaction from the native currency amount.

14. The method according to claim 9, further comprising deducting a fee for the transaction from the foreign currency amount.

15. The method according to claim 9, wherein the transaction card is selected from the group consisting of a credit card, a debit card, an ATM card, a bank card, a gift card. a phone card, a cash card, and a stored value card.

16. The method according to claim 9, Wherein the transaction card comprises a contactless transaction card.

17. A method for depositing foreign funds in a first transaction machine and receiving native funds from a second transaction machine, the method comprising:
   receiving, at a first transaction machine, cash in a first currency from a customer, wherein the total cash in the first currency received from the customer amounts to a first currency amount;
   providing the consumer a transaction identifier from the first transaction machine;
   creating an automated clearing house entry at the first ATM for deposit into a financial account;
   transmitting, from the first ATM, the automated clearing house entry to an originating depository financial institution;
   receiving, at a second transaction machine, the transaction identifier;
   receiving exchange rate information for converting the first currency amount into the second currency;
   converting the first currency amount into a second currency amount according to the exchange rate information, wherein the second currency amount is in a second currency; and
   providing cash in the second currency to the consumer.

18. The method according to claim 17, further comprising receiving a second currency selection from tile consumer at the second transaction machine.

19. The method according to claim 17, wherein tile first transaction machine is located at a place of disembarkment and the second transaction machine is located at a place of disembarkment.

20. The method according to claim 19, wherein the place of disembarkment is selected from the group consisting of an airport, a train terminal, a subway terminal, a seaport; a border crossing terminal; and a facility near a border crossing.

21. The method according to claim 19, wherein the place of disembarkment is selected from the group consisting of an airport, a train terminal, a subway terminal, a seaport; a border crossing terminal: and a facility near a border crossing.

22. The method according to claim 19, wherein the providing the consumer a transaction identifier, comprises providing the consumer a receipt with the transaction identifier.

23. The method according to claim 19, further comprising:
   receiving a security number from the consumer at tile first transaction machine;
   associating the security number with the transaction; and
   receiving the security number from the consumer at the second transaction machine and authenticating the consumer based, in part, on the transaction security number.

24. The method according to claim 19, wherein the transaction identifier comprises a scanable code.

25. The method according to claim 19, further comprising providing the consumer with a card al the first transaction machine, wherein the card comprises a magnetic stripe that is associated with the transaction identifier.

26. The method according to claim 19, wherein the transaction machine comprises an ATM.

27. The method according to claim 19, further comprising providing the consumer with a card at the first transaction machine, wherein the card comprises an RFID chip that is associated with the transaction identifier.

28. A method for depositing foreign funds into a native financial account using a foreign Automated Teller Machine (ATM), the method comprising:
   creating an automated clearing house entry at the foreign ATM for deposit into a financial account associated with a financial account number;
   transmitting, from the foreign ATM, the automated clearing house entry to an originating depository financial institution;
   receiving, at a server from a foreign ATM, the financial account number associated with the financial account maintained by a customer at a financial institution;
   determining, at the server, a native currency type associated with the financial account;
   receiving, at the server from a foreign ATM, a foreign currency amount, wherein the foreign currency amount is a total amount of foreign cash received at the foreign ATM from the customer;
   converting, at the server, the foreign currency amount into a native currency amount;
   transmitting, from the server, the native currency amount to the foreign ATM; and
   crediting, from the server, the native currency amount to the financial account.

29. The method according to claim 28, further comprising receiving, at the server, exchange rate information, wherein the exchange rate information is used to convert the foreign currency amount to the native currency amount.

30. The method according to claim 28, further comprising requesting, by the server, exchange rate in formation, wherein the exchange rate information is used to convert the foreign currency amount to the native currency amount.

31. The method according to claim 28, further comprising deducting, a lee at the server, from the foreign currency amount.

32. The method according to claim 28, further comprising deducting, a fee at tile server, from the native currency amount.

33. A method for depositing foreign funds into a native account using a foreign Automated Teller Machine (ATM), the method comprising:
   sending, from the foreign ATM, a financial account number associated with a financial account maintained by a customer at a financial institution;
   receiving, at the foreign ATM, a native currency type associated with the financial account;
   creating, at the foreign ATM, an automated clearing house entry for deposit into the financial account associated with the financial account number;
   transmitting, from the foreign ATM, the automated clearing house entry to an originating depository financial institution;
   receiving, at the foreign ATM, a native currency amount; and
   displaying, at the foreign ATM, a native currency amount.

34. A method according to claim 33, further comprising, receiving, at the foreign ATM, exchange rate information.

35. A method for depositing foreign funds into a native account using a foreign Automated Teller Machine (ATM), the method comprising:
   sending, from the foreign ATM, a financial account number associated with a financial account maintained by a customer at a financial institution;
   determining, at the foreign ATM, a native currency type associated with the financial account;
   determining, at the foreign ATM, a foreign currency amount, wherein the foreign currency amount is a total amount of foreign cash received at the foreign ATM from the customer;
   converting, at the foreign ATM, the foreign currency amount to a native currency amount according to exchange rate information;
   creating, at the foreign ATM, an automated clearing house entry for deposit into the financial account associated with the financial account number; and
   transmitting, from the foreign ATM, the automated clearing house entry to an originating depository financial institution.

36. The method according to claim 35, further comprising receiving, at the foreign ATM, exchange rate information.

* * * * *